United States Patent
Wang

(10) Patent No.: US 11,363,244 B2
(45) Date of Patent: Jun. 14, 2022

(54) METHODS, SYSTEMS, AND MEDIA FOR IMAGE WHITE BALANCE ADJUSTMENT

(71) Applicant: ZHEJIANG DAHUA TECHNOLOGY CO., LTD., Zhejiang (CN)

(72) Inventor: Tingniao Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/067,700

(22) Filed: Oct. 11, 2020

(65) Prior Publication Data

US 2021/0029337 A1 Jan. 28, 2021

Related U.S. Application Data

(63) Continuation of application No. 16/095,979, filed as application No. PCT/CN2017/081617 on Apr. 24, 2017, now Pat. No. 10,805,588.

(30) Foreign Application Priority Data

Apr. 25, 2016 (CN) .......................... 201610261027.5
Dec. 7, 2016 (CN) ........................... 201611117128.1

(51) Int. Cl.
*H04N 9/73* (2006.01)
*G06V 10/25* (2022.01)
(Continued)

(52) U.S. Cl.
CPC ........... *H04N 9/735* (2013.01); *G06K 9/6218* (2013.01); *G06T 7/90* (2017.01); *G06V 10/25* (2022.01)

(58) Field of Classification Search
CPC ........ H04N 9/735; G06T 7/90; G06K 9/3233; G06K 9/6218
See application file for complete search history.

(56) References Cited

U.S. PATENT DOCUMENTS 5,420,630 A * 5/1995 Takei ..................... H04N 9/735
348/223.1
8,854,709 B1 10/2014 Liu et al.
(Continued)

FOREIGN PATENT DOCUMENTS

| CN | 1694543 A | 11/2005 |
| CN | 101166285 A | 4/2008 |

(Continued)

OTHER PUBLICATIONS

International Search Report in PCT/CN2017/081617 dated Jul. 14, 2017, 4 pages.
(Continued)

*Primary Examiner* — Gevell V Selby
(74) *Attorney, Agent, or Firm* — Metis IP LLC

(57) ABSTRACT

The present disclosure relates to systems and methods for image white balance adjustment. The systems may perform the methods to obtain a target image; determine a first lighting condition of the target image when the target image is captured; determine, based on the first lighting condition of the target image, a white balance gain of the target image; and adjust, based on the white balance gain, white balance of the target image.

20 Claims, 20 Drawing Sheets

(51) Int. Cl.
*G06T 7/90* (2017.01)
*G06K 9/62* (2022.01)

(56) References Cited

U.S. PATENT DOCUMENTS

| | | |
|---|---|---|
| 2003/0058357 A1 | 3/2003 | Aotsuka |
| 2004/0239774 A1 | 12/2004 | Takeshita |
| 2005/0174442 A1 | 8/2005 | Yuyama |
| 2005/0286097 A1 | 12/2005 | Hung et al. |
| 2006/0159336 A1 | 7/2006 | Uezono |
| 2006/0286097 A1* | 12/2006 | Swain .................. A61K 47/646 424/133.1 |
| 2007/0133071 A1 | 6/2007 | Noyes et al. |
| 2008/0101690 A1* | 5/2008 | Hsu ...................... H04N 1/6086 382/162 |
| 2009/0021602 A1 | 1/2009 | Fujiwara et al. |
| 2009/0201374 A1 | 8/2009 | Hung et al. |
| 2010/0214435 A1 | 8/2010 | Chang |
| 2012/0013764 A1 | 1/2012 | Sakai et al. |
| 2014/0241620 A1* | 8/2014 | Zhang .................... H04N 9/735 382/159 |
| 2015/0271460 A1 | 9/2015 | Jung et al. |
| 2016/0007001 A1 | 1/2016 | Kuchiki |
| 2016/0269707 A1* | 9/2016 | Yoshizaki ............. H04N 9/735 |
| 2017/0006272 A1 | 1/2017 | Ioka |

FOREIGN PATENT DOCUMENTS

| | | |
|---|---|---|
| CN | 101193317 A | 6/2008 |
| CN | 103227928 A | 7/2013 |
| CN | 103929632 A | 7/2014 |
| CN | 104113743 A | 10/2014 |
| CN | 105872510 A | 8/2016 |
| WO | 2007149792 A2 | 12/2007 |

OTHER PUBLICATIONS

Written Opinion in PCT/CN2017/081617 dated Jul. 14, 2017, 5 pages.
First Office Action in Chinese Application No. 201611117128.1 dated Feb. 24, 2018, 10 pages.
Examination Report in European Application No. 17788723.9 dated Mar. 29, 2019, 20 pages.
The Extended European Search Report in European Application No. 17788723.9 dated Jul. 19, 2019, 21 pages.

\* cited by examiner

900

```
┌─────────────────────────────────────────────┐  901
│ Determine a plurality of clusters of points │
│ corresponding to a plurality of regions in a │
│              target image                    │
└─────────────────────────────────────────────┘
                      │
                      ▼
┌─────────────────────────────────────────────┐  902
│ Determine a first element corresponding to a │
│   first cluster of the plurality of clusters │
└─────────────────────────────────────────────┘
                      │
                      ▼
┌─────────────────────────────────────────────┐  903
│  Determine a second element corresponding to │
│  a second cluster of the plurality of clusters│
└─────────────────────────────────────────────┘
                      │
                      ▼
┌─────────────────────────────────────────────┐  904
│ Determine a color-temperature vector based on │
│     the first element and the second element  │
└─────────────────────────────────────────────┘
```

METHODS, SYSTEMS, AND MEDIA FOR IMAGE WHITE BALANCE ADJUSTMENT

CROSS-REFERENCE TO RELATED APPLICATION

This application is a continuation of U.S. Ser. No. 16/095,979 filed on Oct. 24, 2018, which is a U.S. national stage of International Application No. PCT/CN2017/081617, filed on Apr. 24, 2017, which claims priority to Chinese Patent Application No. 201610261027.5, filed on Apr. 25, 2016 and Chinese Patent Application No. 201611117128.1, filed on Dec. 7, 2016. The contents of each of the above-referenced applications are expressly incorporated herein by reference to their entireties.

TECHNICAL FIELD

The present disclosure relates to methods, systems, and media for image white balance adjustment. In particular, the present disclosure relates to methods, systems, and media for adjusting white balance of an image based on one or more color components of the image.

BACKGROUND

White balance adjustment is common in image processing. Imaging devices, such as, for example, a camera, a phone, a video recorder, etc., may include the feature of white balance adjustment. The imaging device may be used in different lighting conditions. A white balance adjustment system and method that can accommodate different lighting conditions may be needed.

SUMMARY

The present disclosure relates to methods, systems and media for image white balance adjustment. According to one aspect of the present disclosure, a method for adjusting image white balance is provided. The method may include one or more of the following operations. A target image may be obtained. A first lighting condition of the target image may be determined when the target image is captured. Based on the first lighting condition of the target image, a white balance gain of the target image may be determined. Based on the white balance gain, white balance of the target image may be adjusted.

According to another aspect of the present disclosure, a system including a processor and a storage device for adjusting image white balance is provided. The system may include a lighting condition module, a white balance gain module and a white balance adjustment module. The lighting condition module may be configured to determine a first lighting condition of a target image when the target image is captured. The white balance gain module may be configured to determine, based on the first lighting condition of the target image, a white balance gain of the target image. The white balance adjustment module may be configured to adjust, based on the white balance gain, white balance of the target image.

According to another aspect of the present disclosure, a non-transitory computer readable medium embodying a computer program product is provided. The computer program product may include instructions, when executed, may cause a computing device to effectuate the methods disclosed herein.

According to a further aspect of the present disclosure, a system is provided. The system may include at least one processor configured to obtain a target image and a storage device configured to store instructions. The instructions, when executed by the at least one processor, may cause the system to effectuate the methods disclosed herein.

In some embodiments, the first lighting condition of the target image may include natural light, light of mixed sunlight and artificial light, light of a single color temperature, or light of multiple color temperatures.

In some embodiments, a first lighting condition of the target image may comprise one or more operations may be determined by performing one or more of the following operations. One or more regions in the target image may be determined. For at least one region of the one or more regions in the target image, based on values of one or more color components of a pixel in at least one region, coordinate information relating to the at least one region may be determined. Based on the target image, reference information relating to the at least one region may be determined. The first lighting condition of the target image may be determined based on the reference information and/or the coordinate information relating to the at least one region.

In some embodiments, the coordinate information relating to the at least one region includes a coordinate system relating to values of one or more color components of a pixel in the at least one region and coordinates of a point in the coordinate system, a point corresponding to a region in the target image.

In some embodiments, coordinate information relating to the at least one region may include one or more operations may be determined by performing one or more of the following operations. First values of a first color component of one or more pixels in the at least one region may be determined. Second values of a second color component of the one or more pixels in the at least one region may be determined. Third values of a third color component of the one or more pixels in the at least one region may be determined. A first characteristic value of the first color component may be determined based on the first values. A second characteristic value of the second color component may be determined based on the second values. A third characteristic value of the third color component may be determined based on the third values. A first evaluation parameter and a second evaluation parameter of the at least one region may be determined based on the first characteristic value, the second characteristic value, and the third characteristic value. The coordinates of at least one point in the coordinate system, the at least one point representing the at least one region in the target image may be determined based on the first evaluation parameter and the second evaluation value.

In some embodiments, the reference information may include a first color-temperature vector of the target image. The first color-temperature vector of the target image may be determined. Based on the first color-temperature vector and the coordinates of the at least one point that represents the at least one region in the target image, the first lighting condition of the target image may be determined.

In some embodiments, the first color-temperature vector may be determined by performing one or more of the following operations. The at least one region to form a plurality of clusters including a first cluster and a second cluster may be clustered based on the coordinates of the at least one point that represents the at least one region in the target image. A first element corresponding to the first cluster may be determined. A second element corresponding to the second cluster may be determined. The first color-temperature vector may be obtained based on the first element and the second element.

In some embodiments, a first lighting condition of the target image may be determined by performing one or more of the following operations. A second color-temperature vector of a reference image captured in a second lighting condition including light of multiple color temperatures may be obtained. An angle between the first color-temperature vector and the second color-temperature vector may be determined. The first lighting condition of the target image based on the angle may be obtained.

In some embodiments, the first lighting condition of the target image may be determined based on the angle by performing one or more of the following operations. The angle may be compared with a threshold angle. In response to the determination that the angle exceeds the threshold angle that the first lighting condition of the target image includes light of a single color temperature. In response to the determination that the angle is less than the threshold angle, that the first lighting condition of the target image includes light of multiple color temperatures.

In some embodiments, a white balance gain of the target image may be determined by performing one or more of the following operations. A first white balance gain of the target image according to a first white balance gain algorithm may be determined. A second white balance gain of the target image according to a second white balance gain algorithm may be determined. A multi-color-temperature parameter may be determined based on the angle between the first color-temperature vector and the second color-temperature vector. A first gain weight of the first white balance gain and a second gain weight of the second white balance gain may be determined based on the multi-color-temperature parameter. A white balance gain may be determined based on the first gain weight, the second gain weight, the first white balance gain, and the second white balance gain.

In some embodiments, the second gain weight of the second white balance gain may be equal to the multi-color-temperature parameter, and the sum of the first gain weight and the second weight gain is equal to one.

In some embodiments, a ratio of the second gain weight to the sum of the first gain weight and the second weight gain may be equal to the multi-color-temperature parameter.

In some embodiments, the reference information may comprise a near infrared intensity of the at least one region.

In some embodiments, a first lighting condition of the target image may be determined by performing one or more of the following operations. A characteristic value of a color component of the at least one region may be obtained. The near infrared intensity of the at least one region may be obtained. A ratio of the near infrared intensity of the at least one region to the characteristic value of the color component of the at least one region may be determined. Lighting condition of the at least one region may be determined based on the ratio. The first lighting condition of the target image may be determined based on the lighting condition of the at least one region.

In some embodiments, a white balance gain of the target image may be determined by performing one or more of the following operations. The near infrared intensity of the at least one region may be obtained. The coordinates of at least one point that represents the at least one region may be obtained. At least one region weight of the at least one region may be determined based on the near infrared intensity of the at least one region and the coordinates of the at least one point that represents the at least one region. The white balance gain of the target image may be obtained based on the at least one region weight of the at least one region.

In some embodiments, the at least one region weight of the at least one region may be obtained by performing one or more of the following operations. The distance of the point corresponding to a region of the at least one region to the reference color-temperature curve in the first direction or the second direction is between the first distance and the second distance may be determined. A ratio of the near infrared intensity to the characteristic value of the color component of the region corresponding to the point may be determined. A first region weight to the region of the at least one region based on the ratio may be assigned.

In some embodiments, the at least one region weight of the at least one region may be obtained based on the spatial relationship by performing one or more of the following operations. The distance of the point corresponding to a region of the at least one region to the reference color-temperature curve in the first direction or the second direction is not between the first distance and the second distance may be determined. A spatial relationship in the coordinate system among the point corresponding to a region of the at least one region and the two first distance color-temperature curves may be determined. A region weight to the region of the at least one region based on the location relationship may be assigned.

In some embodiments, a region weight to the region of the at least one region may be obtained based on the location relationship by performing one or more of the following operations. The distance of the point corresponding to a region of the at least one region to the reference color-temperature curve in the first direction or the second direction is between the first distance and the second distance may be determined. A ratio of the near infrared intensity to the characteristic value of the color component of the region corresponding to the point may be determined. A first region weight to the region of the at least one region based on the ratio may be assigned.

In some embodiments, the at least one region weight of the at least one region may be obtained based on the spatial relationship by performing one or more of the following operations. The distance of the point corresponding to a region of the at least one region to the reference color-temperature curve in the first direction or the second direc- tion is not between the first distance and the second distance may be determined. A spatial relationship in the coordinate system among the point corresponding to a region of the at least one region and the two first distance color-temperature curves may be determined. A region weight to the region of the at least one region based on the location relationship may be assigned.

In some embodiments, a region weight to the region of the at least one region may be assigned based on the location relationship by performing one or more of the following operations. The distance of the point corresponding to a region of the at least one region to the reference color-temperature curve in the first direction or the second direction is smaller than the first distance may be determined. A second region weight to the region of the at least one region may be assigned.

In some embodiments, the second region weight may be 1.

In some embodiments, a region weight to the region of the at least one region may be assigned based on the location relationship by performing one or more of the following operations. The distance of the point corresponding to a region of the at least one region to the reference color-temperature curve in the first direction or the second direction is greater than the first distance may be determined.

In some embodiments, the third region weight may be 0.

In some embodiments, a first region weight to the region of the at least one region based on the ratio may be assigned by performing one or more of the following operations. The ratio may be determined as less than a threshold ratio. In response to the determination that the ratio is less than the threshold ratio, a fourth region weight to the region of the at least one region may be assigned. The ratio may be determined to exceed the threshold ratio. In response to the determination that the ratio exceeds the threshold ratio, a fifth region weight to the region of the at least one region may be assigned.

In some embodiments, the fourth region weight may be 1.

In some embodiments, the fifth region weight may be 0.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 9 is a flowchart illustrating an exemplary process for determining a color-temperature vector according to some embodiments of the present disclosure;

DETAILED DESCRIPTION

Figure 1:
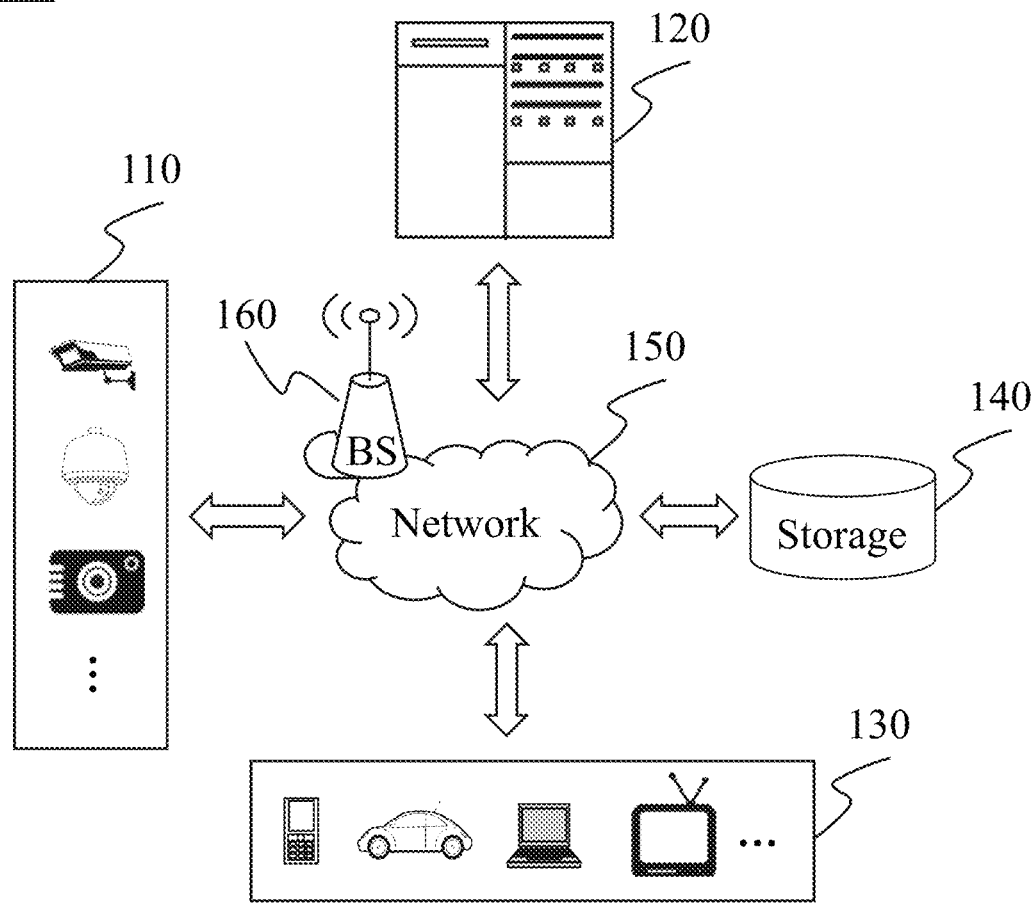
FIG. 1 is a schematic diagram illustrating an exemplary system for white balance adjustment according to some embodiments of the present disclosure.

In accordance with various implementations, as described in more detail below, mechanisms, which can include systems, methods, and media, for image white balance adjustment are provided.

The present disclosure relates to white balance adjustment methods, systems, and media. Specially, the present disclosure relates to adjusting white balance after determining a lighting condition. For an image acquired under the light of multiple color temperatures, a white balance gain may be determined based on a first gain weight corresponding to a first white balance gain, a second gain weight corresponding to a second white balance gain, the first white balance gain and the second white balance gain. In some embodiments, the ratio of the second gain weight to the sum of the first gain weight and the second weight gain may be equal to a parameter relation the multiple color temperatures. The parameter relating to the multiple color temperatures may be determined based on an angle between a first color-temperature vector and a second color-temperature vector of an image of which the lighting condition when the image is acquired is known. For an image acquired under the light of a single color temperature, a white balance gain may be determined based on a white balance gain algorithm, such as a dynamic threshold algorithm. In some embodiments, a white balance gain, e.g., the first white balance gain, the second white balance gain, etc., of the image may be determined based on the white balance gains of a plurality of regions in the image and the corresponding region weights.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "sub-unit" "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure.

FIG. 1 is a schematic diagram illustrating an exemplary system 100 for white balance adjustment according to some embodiments of the present disclosure.

As illustrated, white balance adjustment system 100 may include an imaging device 110, a white balance adjustment device 120, a terminal 130, a storage 140, a network 150, a base station 160, and/or any other suitable component for adjusting white balance in accordance with various embodiments of the disclosure.

The imaging device 110 may be configured to capture one or more images. The one or more images may be images about a static or moving object. The image may include a still picture, a motion picture, a video (offline or live streaming), a frame of a video, or a combination thereof.

The imaging device 110 may be any suitable device that is capable of capturing an image. The imaging device 110 may be and/or include a camera, a sensor, a video recorder, or the like, or any combination thereof. The imaging device 110 may be and/or include any suitable type of camera, such as a fixed camera, a fixed dome camera, a covert camera, a Pan-Tilt-Zoom (PTZ) camera, a thermal camera, etc. The imaging device 110 may be and/or include any suitable type of sensor, such as an audio sensor, a light sensor, a wind speed sensor, or the like, or a combination thereof.

In some embodiments, a light sensor (e.g., an infrared detector) may be configured to obtain a light signal, such as a near infrared signal. In some embodiments, an audio sensor may be configured to obtain an audio signal. The audio signal and the light signal may be configured to provide reference information for processing images captured by the imaging device 110.

Data obtained by the imaging device 110 (e.g., images, audio signals, light signals, etc.) may be stored in the storage 140, sent to the white balance adjustment device 120 or the terminal(s) 130 via the network 150.

The white balance adjustment device 120 may be configured to adjust the white balance of an image. The image may be captured by the imaging device 110 or retrieved from another source (e.g., the storage 140, the terminal(s) 130, etc.). The white balance adjustment device 120 may also be configured to, based on the image, recognize a light, determine a lighting condition, determine a color temperature, or the like, or a combination thereof.

The white balance adjustment device 120 may further be configured to generate a control signal. The control signal may be generated based on a feature of an object, a lighting condition of an image, or the like, or a combination. The control signal may be used to control the imaging device 110. For example, the white balance adjustment device 120 may generate a control signal to make a camera of the imaging device 110 to track an object and obtain an image of an object.

The white balance adjustment device 120 may be any suitable device that is capable of adjusting white balance of an image. For example, the white balance adjustment device 120 may include a high-performance computer specializing in image processing or transaction processing, a personal computer, a portable device, a server, a microprocessor, an integrated chip, a digital signal processor (DSP), a tablet computer, a personal digital assistant (PDA), or the like, or a combination thereof. In some embodiments, the white balance adjustment device 120 may be implemented on a computing device 200A shown in FIG. 2A.

The terminal 130 may be connected to or communicate with the white balance adjustment device 120. The terminal 130 may allow one or more operators (e.g., a law enforcement officer, etc.) to control the production and/or display of the data (e.g., the image captured by the imaging device 110) on a display. The terminal 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to the white balance adjustment device 120 via the network 150 for further processing. Another type of the input device may include a cursor control device, such as a mouse, a trackball, or cursor direction keys to communicate direction information and command selections to, for example, the white balance adjustment device 120 and to control cursor movement on display or another display device.

A display may be configured to display the data received (e.g., the image captured by the imaging device 110). The information may include data before and/or after data processing, a request for input or parameter relating to image acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The storage 140 may store data and/or relevant information or parameters. The data may include an image (e.g., an image obtained by the imaging device 110), a sound signal and/or a light signal. The relevant information may be a color-temperature vector. See, for example, FIGS. 10A and 10B and the description thereof. Exemplary parameters may include an intrinsic parameter (e.g., a focal length, a lens distortion parameter, etc.), an extrinsic parameter (e.g., the pose of a camera, a position parameter of the camera, etc.) of one or more cameras of the imaging device 110. For instance, the parameter may include a gain parameter that may be used to determine an illumination of an image. See, for example, FIG. 10B and the description thereof. As another example, the parameter may include a multiple color temperature parameter that may be used to determine a gain weight. See, for example, FIG. 12 and the description thereof.

The network 150 may facilitate communications between various components of the white balance adjustment system 100. The network 150 may be a single network, or a combination of various networks. The network 150 may be a wired network or a wireless network. The wired network may include using a Local Area Network (LAN), a Wide Area Network (WAN), a Bluetooth, a ZigBee, a Near Field Communication (NFC), or the like, or a combination thereof. The wireless network may be a Bluetooth, a Near Field Communication (NFC), a wireless local area network (WLAN), Wi-Fi, a Wireless Wide Area Network (WWAN), or the like, or a combination thereof. The network 150 may also include various network access points, e.g., wired or wireless access points such as base stations 160 or Internet exchange points through which a data source may connect to the network 150 in order to transmit information via the network 150.

It should be noted that the descriptions above in relation to the white balance adjustment system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the image data generated by the imaging device 110, may be processed by the terminal 130. In some embodiments, the imaging device 110 and the white balance adjustment device 120 may be implemented in one single device configured to perform the functions of the imaging device 110 and the white balance adjustment device 120 described in this disclosure. In some embodiments, the terminal 130, and the storage 140 may be combined with or part of the white balance adjustment device 120 as a single device. Similar modifications should fall within the scope of the present disclosure.

Figure 2A:
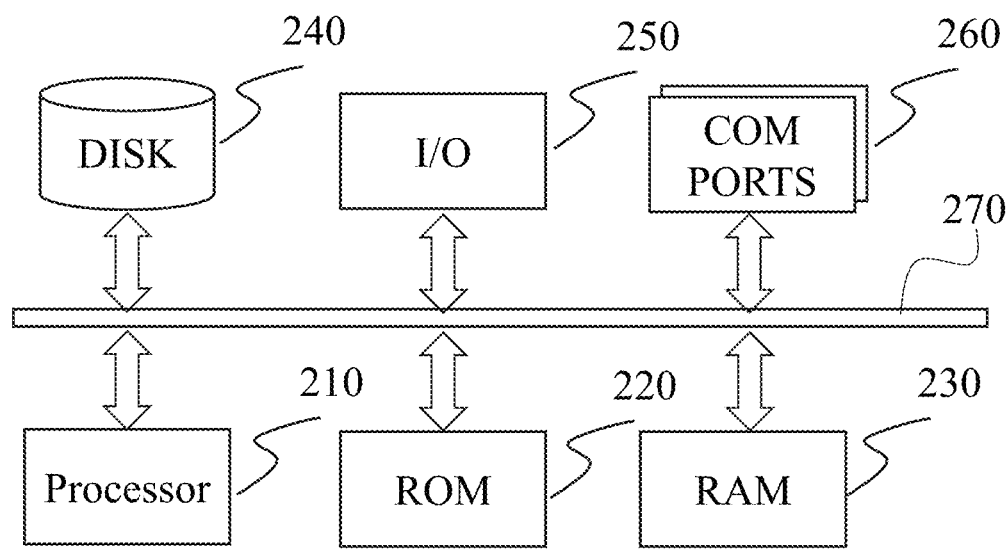
FIG. 2A is an architecture illustrating an exemplary computing device on which a specialized system incorporating the present teaching may be implemented.

FIG. 2A is an architecture illustrating an exemplary computing device 200A on which a specialized system incorporating the present teaching may be implemented. Such a specialized system incorporating the present teaching has a functional block diagram illustration of a hardware platform that may include user interface elements. A computing device 200A may be a general-purpose computer or a special purpose computer. The computing device 200A may be used to implement any component of image processing as described herein. For example, the white balance adjustment device 120 may be implemented on a computer such as the computing device 200, via its hardware, software program, firmware, or a combination thereof. Although only one such computer is shown, for convenience, the computer functions relating to image processing as described herein may be implemented in a distributed fashion on a number of similar platforms, to distribute the processing load.

The computing device 200A, for example, may include a communication (COM) ports 260 connected to and from a network connected thereto to facilitate data communications. The computing device 200A may also include a processor 210, in the form of one or more processors, for executing program instructions stored in a storage device (e.g., a disk 240, a read only memory (ROM) 220, or a random-access memory (RAM) 230)), and when executing the program instructions, the processor 210 may be configured to cause the computing device 200A to perform the functions thereof described herein.

The exemplary computer platform may include an internal communication bus 270, program storage, and data storage of different forms, e.g., a disk 240, a ROM 220, or a RANI 230, for various data files to be processed and/or communicated by the computer, as well as possibly program instructions to be executed by the processor 210. The computing device 200A may also include an I/O component 250, supporting input/output flows between the computer and other components therein such as user interface elements (not shown in FIG. 2A). The computing device 200A may also receive programming and data via network communications.

Aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A non-transitory machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

Figure 2B:
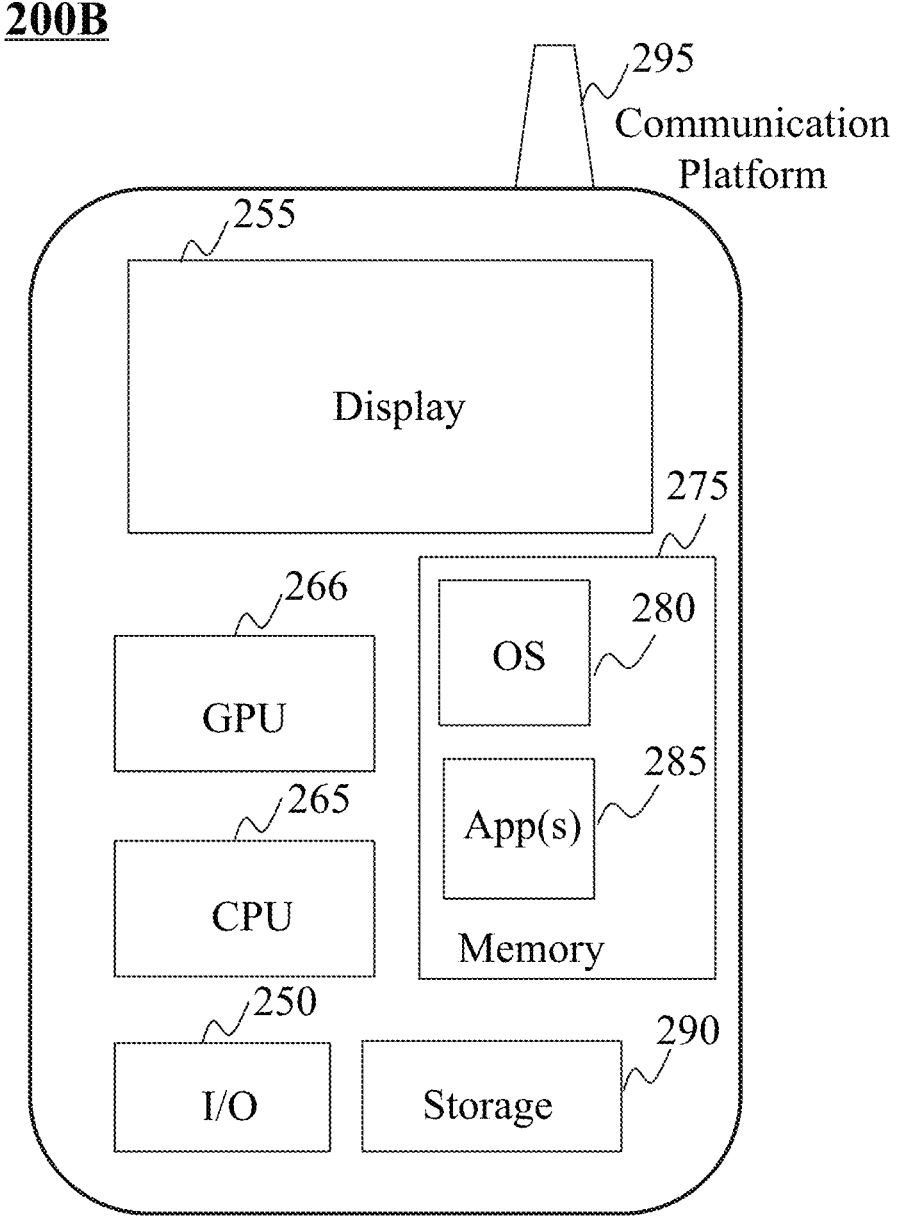
FIG. 2B is a schematic diagram illustrating exemplary hardware and/or software components of an exemplary mobile device on which the terminal may be implemented according to some embodiments of the present disclosure.

FIG. 2B is a schematic diagram illustrating exemplary hardware and/or software components of an exemplary mobile device 200B on which the terminal 130 may be implemented according to some embodiments of the present disclosure. As illustrated in FIG. 2B, the mobile device 200B may include a communication platform 295, a display 255, a graphic processing unit (GPU) 266, a central processing unit (CPU) 265, an I/O 250, a memory 275, and a storage 290. In some embodiments, any other suitable component, including but not limited to a system bus or a controller (not shown), may also be included in the mobile device 200B. In some embodiments, a mobile operating system 280 (e.g., iOS™, Android, Windows Phone™, etc.) and one or more applications 285 may be loaded into the memory 275 from the storage 290 in order to be executed by the CPU 265. The applications 285 may include a browser or any other suitable mobile apps for receiving and rendering information relating to image processing or other information from, for example, the white balance adjustment device 120. User interactions with the information stream may be achieved via the I/O 250 and provided to the white balance adjustment device 120 and/or other components of the Diagnostic and treatment system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 3:
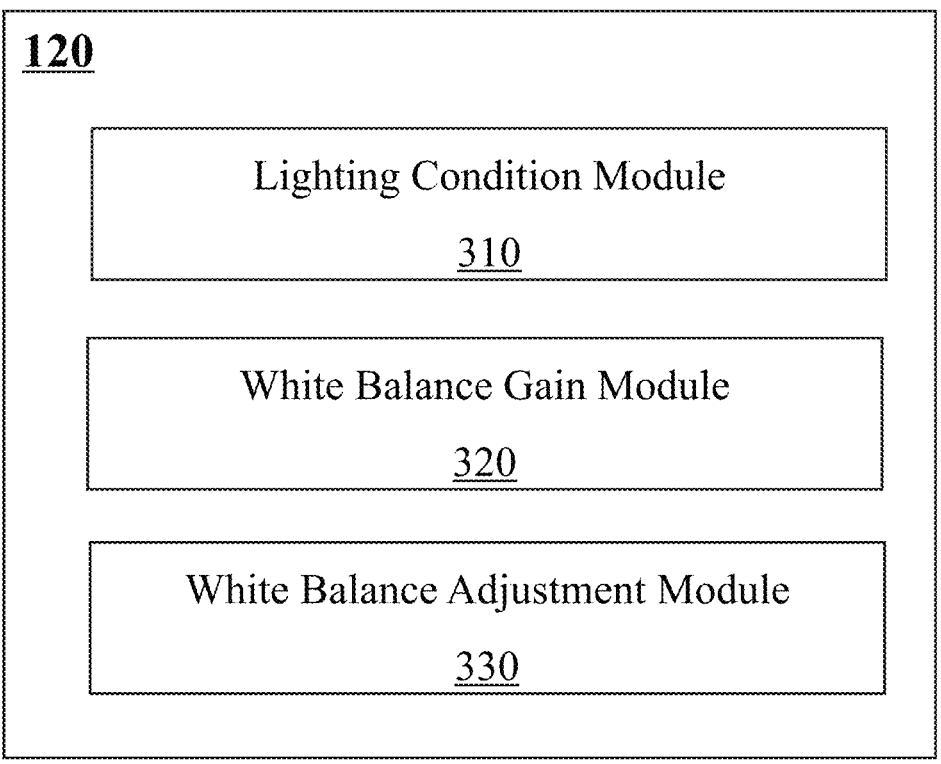
FIG. 3 is a block diagram illustrating an exemplary white balance adjustment device according to some embodiments of the present disclosure.

FIG. 3 is a block diagram illustrating an exemplary white balance adjustment device 120 according to some embodiments of the present disclosure.

As shown, the white balance adjustment device 120 may include a lighting condition module 310, a white balance gain module 320, a white balance adjustment module 330, and/or any other suitable component for adjusting white balance of an image in accordance with the various embodiments of the disclosure. The white balance adjustment device 120 may include more or fewer components without loss of generality. For example, two of the modules may be combined into a single module, or one of the modules may be divided into two or more modules. In some embodiments, one or more of the modules may reside on different computing devices (e.g., a desktop, a laptop, a mobile device, a tablet computer, a wearable computing device, or the like, or a combination thereof). In some embodiments, the white balance adjustment device 120 may be implemented on the computing device 200A shown in FIG. 2A or the mobile device 200B shown in FIG. 2B.

The lighting condition module 310 may be configured to determine the lighting condition of an image. Exemplary lighting conditions may include the nature of a light source such as, e.g., natural light (e.g., direct sunlight, scattered sunlight, positive sunlight, side sunlight, etc.) or an artificial light (e.g., a fire, an oil lamp, a candle, an incandescent lamp, a tungsten halogen lamp, a fluorescent lamp, etc.). Exemplary lighting conditions may include the number of light sources such as, e.g., a single light source (e.g., a natural light source, an artificial light source, etc.) or a mixed light source (e.g., mixing sunlight and artificial light, mixing lights from two or more artificial light sources, etc.). Exemplary lighting conditions may include the composition of light in terms of the color temperature(s) such as, e.g., light of a single color temperature or light of multiple color temperatures. As used herein, the color temperature of light of interest refers to the temperature of an ideal blackbody radiator that radiates light of a color comparable to that of the light of interest. Light of multiple color temperatures may be emitted by a single light source or include light with more than one color temperatures from more than one light source (e.g., a white LED lamp including a white LED of a low color temperature and a white LED of a high color temperature).

In some embodiments, the lighting condition of an image may be natural light. Merely by way of example, the lighting condition of the image may be natural light of a single color temperature. In some embodiments, the lighting condition of the image may be natural light of multiple color temperatures. For example, the color temperature of direct sunlight may be about 4870K; the color temperature of light from an overcast sky may be about 6770K. An image may be captured partly under direct sunlight and partly under an overcast sky. As another example, the color temperature of direct sunlight may be about 4800K; the color temperature of sunlight under a shade (e.g., in a shaded area under a tree, in a shaded area near a building, etc.) may be about 4700K. An image may be captured partly under direct sunlight and partly in a shaded area. In some embodiments, the lighting condition of an image may be a mixed light source including natural light and one or more artificial lights.

White balance gain module 320 may be configured to determine a white balance gain of an image. The white balance gain may be determined based on a color model. In some embodiments, the white balance gain of an image may include a plurality of gain components corresponding to a plurality of color components of the image. Merely by way of example with reference to an RGB color model, the white balance gain of the image may include a red gain of the red component (or referred to as the red color component), a green gain of the green component (or referred to as the green color component), and a blue gain of the blue component (or referred to as the blue color component) of the image.

In some embodiments, a white balance gain of an image may be determined based on a combination of a first balance gain of the image according to a first white balance gain algorithm and a second balance gain of the image according to a second white balance gain algorithm. See, for example, FIG. 12 and the description thereof. Exemplary white balance gain algorithms may include a grey world algorithm, a dynamic threshold algorithm, an automatic white balance algorithm, a perfect reflector algorithm, a gamut mapping algorithm, a color by correlation algorithm, a neural network approach to color constancy algorithm, or the like, or any combination thereof.

In some embodiments, a white balance gain of an image may be determined based on a combination of white balance gains of a plurality of regions in an image and corresponding region weights. See, for example, FIG. 13 and the description thereof. Merely by way of example, the region weight of a region of the plurality of regions may be determined based on a near infrared intensity of the image and the coordinates of a point corresponding to the region.

White balance adjustment module 330 may be configured to adjust white balance of an image. The white balance adjustment module 330 may adjust the white balance of the image by adjusting the color component values of more than one color components of each pixel of the image. In an RGB color model, an R value corresponding to the red component, a G value corresponding to the green component, and a B value corresponding to the blue component of the image may be adjusted based on a white balance gain. For example, the white balance of an RGB image (i.e., an image described by an RGB color model) may be adjusted by multiplying the R value of each pixel of the RGB image by an R value gain ($R_{gain}$), multiplying the G value of each pixel of the RGB image by a G value gain ($G_{gain}$), and multiplying the B value of each pixel of the RGB image by a B value gain ($B_{gain}$).

In some embodiments, some other color models including, for example, a CMYK color model, an XWZ color model, or the like, may be used to determine a white balance gain of an image. The image may be adjusted similarly by performing the operations described above based on the determined white balance gain. The following descriptions are provided with reference to the RGB color model for illustration purposes, and not intended to limit the scope of the present disclosure.

It should be understood that the preceding description of white balance adjustment device 120 is merely provided for the purposes of illustration, and not intended to limit the scope of the present disclosure. For persons having ordinary skills in the art, various variations and modifications may be made in the light of the present disclosure. For example, the white balance adjustment device 120 may also include a storage module (not shown in FIG. 3). However, those variations and modifications do not depart from the protecting scope of the present disclosure.

Figure 4:
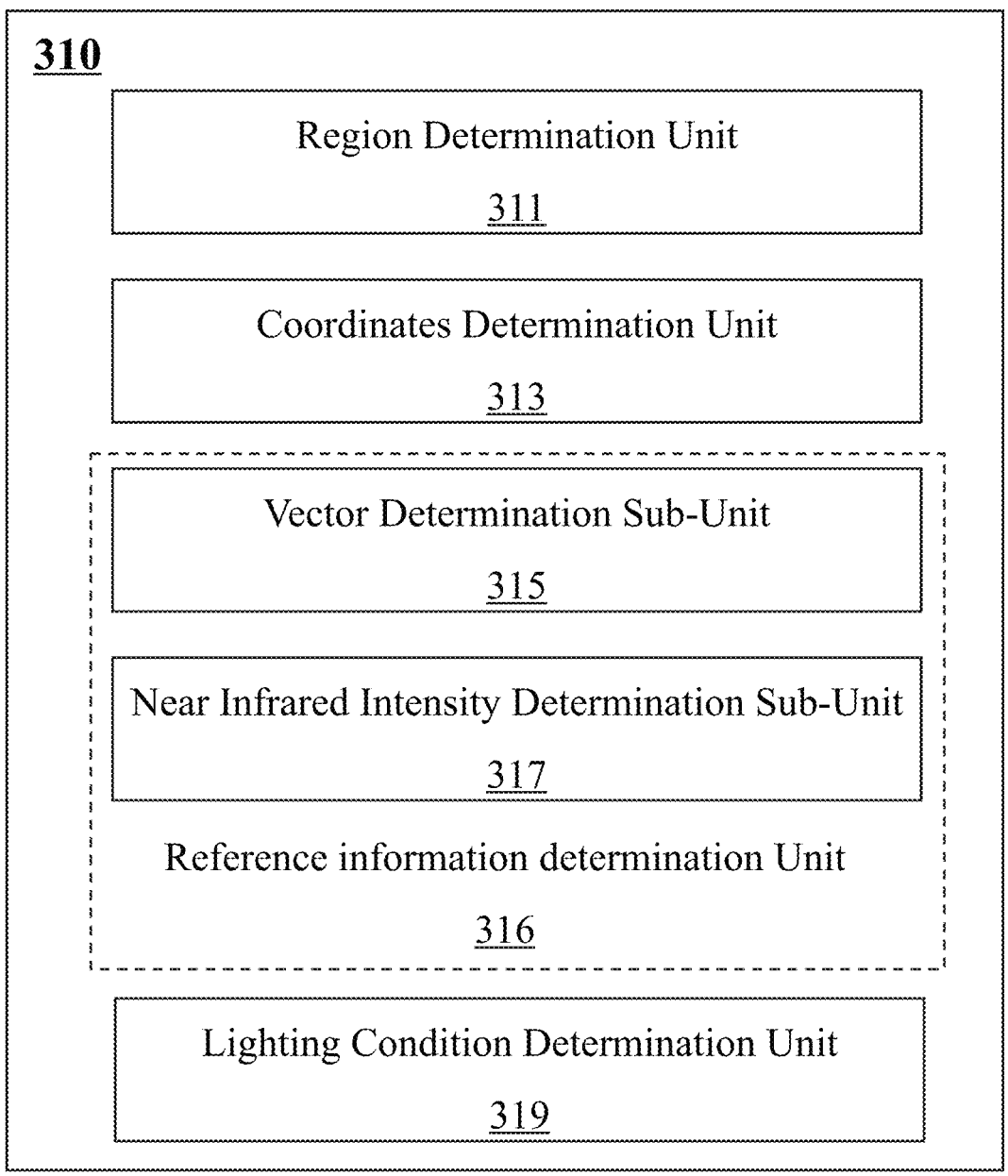
FIG. 4 is a block diagram illustrating an exemplary lighting condition determination module according to some embodiments of the present disclosure.

FIG. 4 is a block diagram illustrating an exemplary lighting condition module 310 according to some embodiments of the present disclosure.

Figure 16:
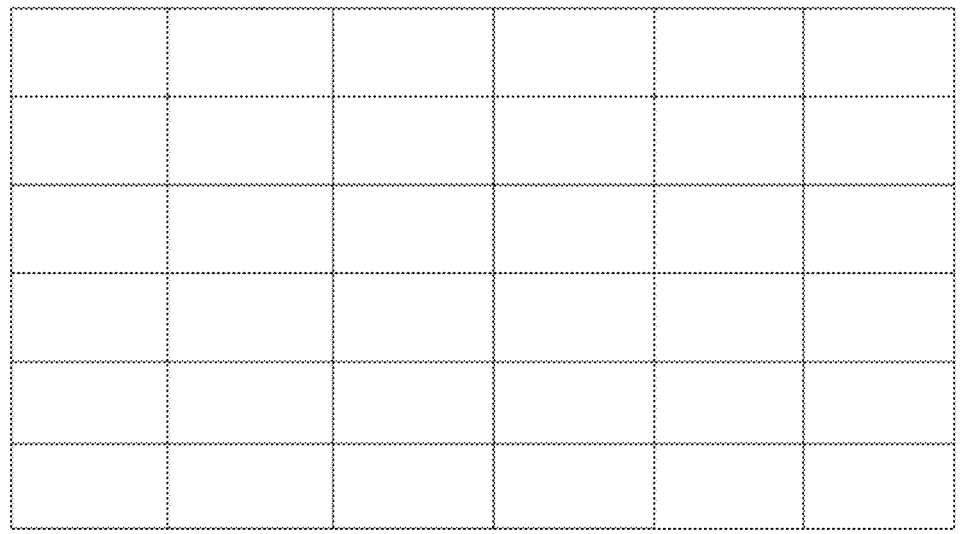
FIG. 16 is an exemplary sixty-six square regions in an image according to some embodiments of the present disclosure.

As shown, the lighting condition module 310 may include a region determination unit 311, a coordinates determination unit 313, a reference information determination unit 316, a lighting condition determination unit 319, and/or any other suitable components for determining a lighting condition of an image in accordance with the various embodiments of the disclosure. The lighting condition module 310 may include more or fewer components lighting condition without loss of generality. For example, two of the units may be combined into a single unit, or one of the units may be divided into two or more units. In some embodiments, one or more of the units may reside on different computing devices (e.g., a desktop, a laptop, a mobile device, a tablet computer, a wearable computing device, or the like, or a combination thereof). In some embodiments, the user interface may be implemented on a computing device 200A as illustrated in FIG. 2A, or a mobile device 200B as illustrated in FIG. 2B. The region determination unit 311 may be configured to determine a plurality of regions in an image. A region of the plurality of regions may be a portion of the image. A region of the plurality of regions may be of any shape. For example, the region may have the shape of a rectangle (as shown in FIG. 16), a square, a parallelogram, a circle, an ellipse, a triangle, a rhombus, a trapezoid, an irregular shape, or the like, or any combination thereof. A region of the plurality of regions may be of any size. For example, a region of the plurality of regions may include at least one pixel. As another example, each region of the plurality of regions may include one pixel. In some embodiments, at least two of the plurality of regions may share a same feature including, for example, size, shape, etc. In some embodiments, at least two of the plurality of regions may be different with respect to a feature including, for example, size, shape, etc. For example, the plurality of regions of the image may include regions of different shapes or of the same shape. In some embodiments, at least two regions of the plurality of regions overlap with each other. In some embodiments, at least two regions of the plurality of regions do not overlap with each other. In some embodiments, no regions of the plurality of the regions overlap.

The region determination unit 311 may determine the plurality of regions by dividing an image. Exemplary techniques of dividing the image may include a threshold segmentation algorithm, a region growing algorithm, a split and merge algorithm, a Markov random field (MRF) algorithm, a labeling algorithm, or the like, or any combination thereof. In some embodiments, the plurality of regions may be determined based on a user input. For example, a user may specify the plurality of regions manually by drawing, via a user interface, one or more lines on the image.

The coordinate determination unit 313 may be configured to determine coordinate information relating to a region in an image. The coordinate information may be the coordinates in a coordinate system of a point corresponding to a region in the image.

The coordinate system may be a one-dimensional coordinate system or a multi-dimensional coordinate system (e.g., a two-dimensional coordinate system). The coordinate system may be determined based on a color model, such as an RGB color model, a XWZ color model, a CMYK color model, the like, or a combination thereof. As used herein, a color model refers to a mathematical model describing the way colors can be represented as sets of numbers, for example, sets of three or four values or color components. The coordinate axes of the coordinate system may correspond to a color component of the image or a combination of more than one color components of the image. The point corresponding to a region in the image may be a point with its coordinates in a coordinate system determined by one or more pixels within a region of the image.

In some embodiments, an RGB color model with three color components (the red component, the green component, and the blue component) and a two-dimensional coordinate system may be used to exhibit the color temperature of an image. The two-dimensional coordinate system may include a horizontal axis and a vertical axis. The horizontal axis and the vertical axis may each represent a value relating to a color component or a combination of multiple (e.g., 2, 3, 4, etc.) color components. In some embodiments, each one of the horizontal axis and the vertical axis may represent a value relating to a color component. For example, the horizontal axis may represent the red component, and the vertical axis may represent the green component. In some embodiments, each one of the horizontal axis and the vertical axis may represent a value relating to multiple color components. For example, the horizontal axis may represent a ratio of a green component to the red component (i.e., G/R), and the vertical axis may represent a ratio of a green component to a blue component (i.e., G/B). As another example, the horizontal axis may represent a logarithm of the ratio of a green component to the red component (i.e., a logarithm of G/R) and the vertical axis may represent a logarithm of the ratio of a green component to a blue component (i.e., a logarithm of G/B). In some embodiments, one of the horizontal axis and the vertical axis may represent a value relating to a color component, and the other may represent a value relating to multiple color components. For example, the horizontal axis may represent the red component or a variation thereof (e.g., a logarithm thereof, etc.), and the vertical axis may represent ratio of the green component to the blue component (i.e., G/B) or a variation thereof (e.g., a logarithm thereof, etc.).

The coordinates determination unit 313 may determine a horizontal coordinate and a vertical coordinate of a point corresponding to a region in the image (or referred to as a region for brevity) in the coordinate system. The horizontal and vertical coordinates of the point may be determined based on the values of one or more color components of a region in the image. In some embodiments, a coordinate of a point may relate to a characteristic value of a color component (e.g., the red component, the green component, the blue component, etc.) of the pixels in a region corresponding to the point. The characteristic value may be result of an up sampling of the image. For instance, a characteristic value of a color component may be an average of the values of the color component of the pixels in the region. In some embodiments, a coordinate of a point may relate to a characteristic value of more than one color component of the pixels in a region corresponding to the point. For instance, a characteristic value of the more than one color component may be an average of the values of the more than one color component of the pixels in the region. Merely by way of example, the average of the values of the color component of the pixels in the region may be an arithmetic mean, determined based on a sum of the values of the color component of the pixels in the region and a count of the color component of the pixels in the region. As another example, the average of the values of the color component of the pixels in the region may be a weighted mean, determined based on a sum of the values of the color component of the pixels in the region and a weight of the color component of the pixels in the region. In some embodiments, the characteristic value of the more than one color component may relate to a ratio of the values of the more than one color components (e.g., the G/R, the G/B, etc.), a logarithm of such a ratio (e.g., a logarithm of G/R, a logarithm of G/B, etc. In some embodiments, the characteristic value relating to a coordinate of a point may be the value of a pixel (e.g., the pixel at the gravity center of a single-pixel or multi-pixel region, etc.) in the region corresponding to the point. The horizontal and vertical coordinates of points corresponding to the plurality of regions of an image described by a color model other than the RGB color model, e.g., a CMYK color model, an XWZ color model, etc., may be determined similarly.

The reference information determination unit 316 may include a vector determination sub-unit 315, a near infrared intensity determination sub-unit 317, and/or any other suitable components for determining reference information in accordance with the various embodiments of the disclosure. The reference information may be a vector (e.g., a color-temperature vector), a near infrared intensity, or the like, or any combination thereof.

The vector determination sub-unit 315 may be configured to determine a color-temperature vector. The vector determination sub-unit 315 may determine a plurality of clusters of points, a point corresponding to a region of the plurality of regions in an image. The vector determination sub-unit 315 may determine a first element corresponding to a first cluster and a second element corresponding to a second cluster. The vector determination sub-unit 315 may determine a vector based on the first element and the second element. More description of the vector determination may be found elsewhere in the present disclosure. See, for example, FIG. 9 and the description thereof.

The near infrared intensity determination sub-unit 317 may be configured to determine the near infrared intensity of an image or a portion thereof. The near infrared intensity determination sub-unit 317 may determine the near infrared intensity of the image or a portion thereof by, for example, an optical filter, a photo sensor, etc. For instance, the optical filter may transmit the near infrared to a photo sensor. The near infrared intensity of an image or a portion thereof may be determined based on a voltage of the photo sensor, a shutter time, and a magnification of an imaging device. See, for example, FIG. 11 and the description thereof. In some embodiments, the wavelength of the near infrared may be from approximately 700 nm to approximately 900 nm.

The lighting condition determination unit 319 may be configured to determine the lighting condition of the image or a portion thereof. The lighting condition may include the nature of a light source (e.g., natural light, artificial light, etc.), the number of light sources (e.g., a single light, a mixed light source, etc.), the color temperature(s) of light, or the like, or a combination thereof.

The lighting condition may be determined based on one or more characteristics (e.g., color, direction, illumination characteristics, etc.) of the light involved when an image is captured. In some embodiments, the lighting condition may be determined based on a characteristic value (e.g., an average value, etc.) of a color component of a region and the near infrared intensity of the region. For instance, the fluorescent lamp and the natural light may be distinguished on a near infrared spectrogram. See, for example, FIG. 11, FIG. 20, and FIG. 21 and the description thereof. In some embodiments, the lighting condition may be determined based on the illumination condition when an image is captured, for example, one or more color-temperature vectors (e.g., color-temperature vector determined by vector determination sub-unit 315) of an image, etc. See, for example, FIGS. 10A and 10B and the description thereof.

It should be understood that the preceding description of the lighting condition module 310 is merely provided for the purposes of illustration, and not intended to limit the scope of the present disclosure. For persons having ordinary skills in the art, various variations and modifications may be made in the light of the present disclosure. For example, the lighting condition module 310 may further include an illumination unit (not shown in FIG. 4). The illumination unit may determine the illumination of an image based on the shooting shutter time, a gain parameter, and the aperture of a camera. However, those variations and modifications do not depart from the protecting scope of the present disclosure.

Figure 5:
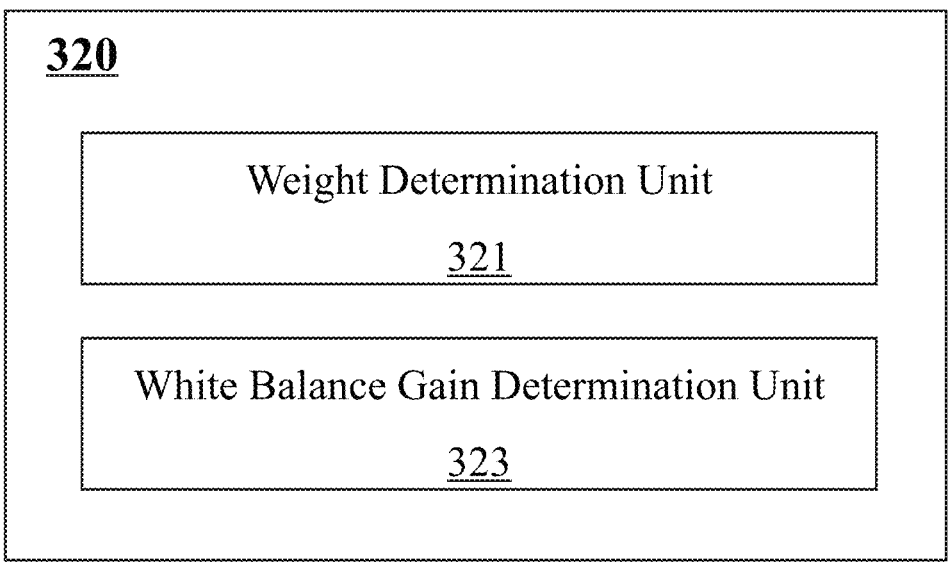
FIG. 5 is a block diagram illustrating an exemplary white balance gain determination module according to some embodiments of the present disclosure.

FIG. 5 is a block diagram illustrating an example of a white balance gain module 320 according to some embodiments of the present disclosure. As shown, the white balance gain module 320 may include a weight determination unit 321, a white balance gain determination unit 323, and/or any other suitable component for determining a white balance gain in accordance with the various embodiments of the disclosure. The white balance gain module 320 may include more or fewer components without loss of generality. For example, two of the units may be combined into a single unit, or one of the units may be divided into two or more units. In one implementation, one or more of the units may reside on different computing devices (e.g., a desktop, a laptop, a mobile device, a tablet computer, a wearable computing device, or the like, or a combination thereof).

The weight determination unit 321 may be configured to determine a weighting factor, or referred to as a weight for brevity. The weight may be a gain weight corresponding to a color component of an image, or a portion thereof, based on a white balance gain algorithm as exemplified in FIG. 12 and the description thereof. The weight may be a region weight corresponding to a region of an image as exemplified in FIGS. 14 and 15 and the description thereof.

The white balance gain determination unit 323 may be configured to determine a white balance gain. In an RGB color model, the white balance gain may include a red gain of the red component (e.g., a green gain of the green component (e.g., and/or a blue gain of the blue component (e.g., $B_{gain}$). In an XWZ color model, the white balance gain may include an X gain of an X component (e.g., $X_{gain}$), a W gain of a W component (e.g., $W_{gain}$), and/or a Z gain of a Z component (e.g., $Z_{gain}$). Similar gain may be determined in a CMYK color model.

Figure 12:
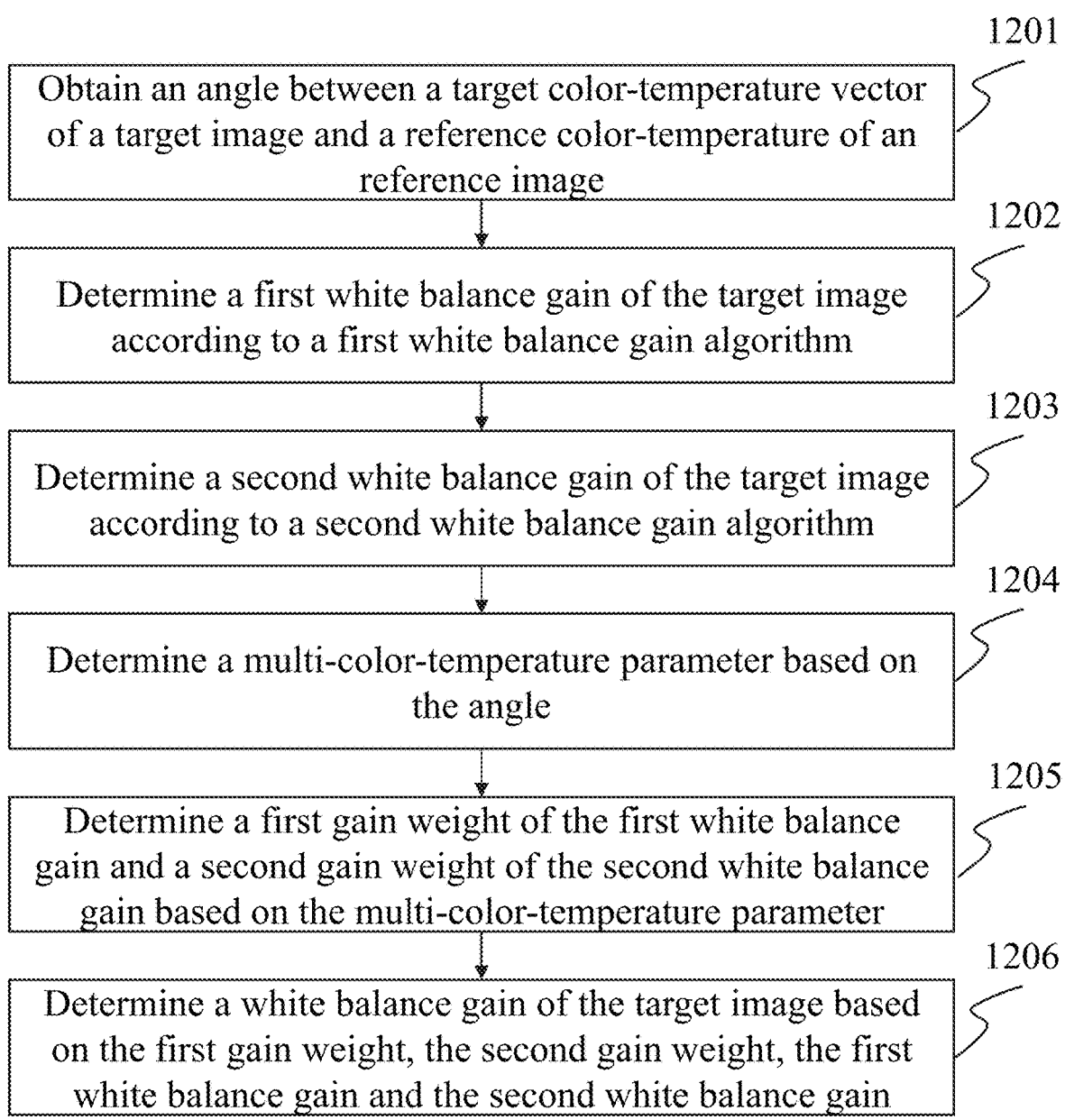
FIG. 12 is a flowchart illustrating an exemplary process for determining a white balance gain according to some embodiments of the present disclosure.

In some embodiments, the white balance gain may be determined based on a first gain weight, a first white balance gain, a second gain weight, and a second white balance gain as exemplified in FIG. 12 and the description thereof. In some embodiments, the white balance gain may be determined based on a plurality of region weights corresponding to the plurality of regions in the image. See, for example, FIG. 13 and the description thereof.

It should be understood that the preceding description of the white balance gain determination module is merely provided for the purposes of illustration, and not intended to limit the scope of the present disclosure. For persons having ordinary skills in the art, various variations and modifications may be made in the light of the present disclosure. For example, the white balance gain module 320 may further include a white balance gain algorithm unit (not shown in FIG. 5). The white balance gain algorithm unit may store one or more white balance gain algorithms. However, those variations and modifications do not depart from the protecting scope of the present disclosure.

Figure 6:
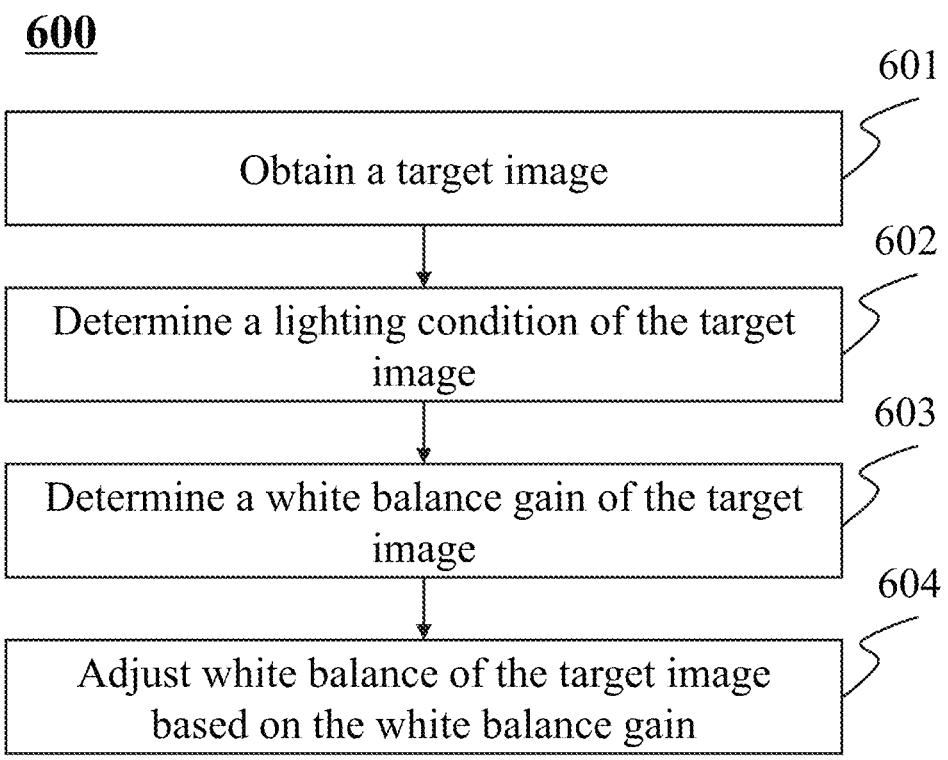
FIG. 6 is a flowchart illustrating an exemplary process for adjusting white balance of an image according to some embodiments of the present disclosure.

FIG. 6 is a flowchart illustrating an exemplary process 600 for adjusting white balance of an image according to some embodiments of the present disclosure. In some embodiments, one or more operations of process 600 may be performed by the white balance adjustment device 120. In some embodiments, one or more operations of process 600 for adjusting white balance of the image may be performed by the computing device 200A as illustrated in FIG. 2A, or the mobile device 200B as illustrated in FIG. 2B.

At 601, a target image may be obtained. The target image may be captured by one or more sensors and/or imaging devices, from one or more viewpoints, at one or more times, in one or more scenarios, etc. The target image may be captured under one or more of various lighting conditions. Various types of artificial lighting may cause an object in the image to have an orange hue. Natural lighting under some circumstances may cause an object in the image to have a blue hue. In some embodiments, the target image may be retrieved from a storage device (e.g., the storage 140 illustrated in FIG. 1, the disk 240 illustrated in FIG. 2A) or received from an imaging device (e.g., the imaging device 110 illustrated in FIG. 1). In some embodiments, the target image may be retrieved from an external source, such as a hard disk, a wireless terminal, or the like, or any combination thereof, that is connected to or otherwise communicating with the system 100.

At 602, the lighting condition of the target image may be determined. In some embodiments, the determination of the lighting condition may be performed by the lighting condition module 310 as exemplified in FIGS. 3 and 4 and the description thereof. As used herein, the lighting condition of an image refer to the lighting under which the image is captured.

In some embodiments, various types of lights may be present when the target image is captured. For example, the target image may be captured under light of multiple color temperatures. As another example, the target image may be captured under light of a single color temperature. As still another example, the target image may be captured under light from mixed light sources (e.g., sunlight and light from an artificial light source, light from two or more artificial light sources, etc.).

At 603, a white balance gain of the target image may be determined. In some embodiments, one or more operations of the white balance gain determining may be performed by the white balance gain module 320 as described in exemplified in FIGS. 3 and 5 and the description thereof.

In some embodiments, the white balance gain may be determined based on one or more white balance gain algorithms. For instance, the white balance gain may be determined based on a first gain weight corresponding to a first white balance gain, a second gain weight corresponding to a second white balance gain, the first white balance gain, and the second white balance gain. The first white balance gain may be determined according to a first white balance gain algorithm (e.g., a dynamic threshold algorithm), and the second white balance gain may be determined according to a second white balance gain algorithm (e.g., a grey world algorithm). The first gain weight and the second gain weight may be determined based on a parameter relating to a color temperature of the image. For instance, a ratio of the second gain weight to the sum of the first gain weight and the second gain weight may be equal to a multi-color-temperature parameter. The multi-color-temperature parameter may be determined based on an angle between a first color-temperature vector and a second color-temperature vector described elsewhere in the present disclosure. See, for example, FIG. 12 and the description thereof. In some embodiments, the sum of the gain weights of the white balance gains on the basis of which the white balance gain is determined is 1.

In some embodiments, the white balance gain may be determined based on a plurality of region weights corresponding to a plurality of regions in the image. See, for example, FIG. 13 and the description thereof.

At 604, white balance of the target image may be adjusted based on the white balance gain. In some embodiments, one or more operations of white balance adjustment of the target image may be performed by the white balance adjustment module 330 as exemplified in FIG. 3 and the description thereof.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some steps may be reduced or added. For example, 602 may be omitted. The lighting condition of an image may be known. However, those variations and modifications may not depart from the protecting of some embodiments of the present disclosure.

Figure 7:
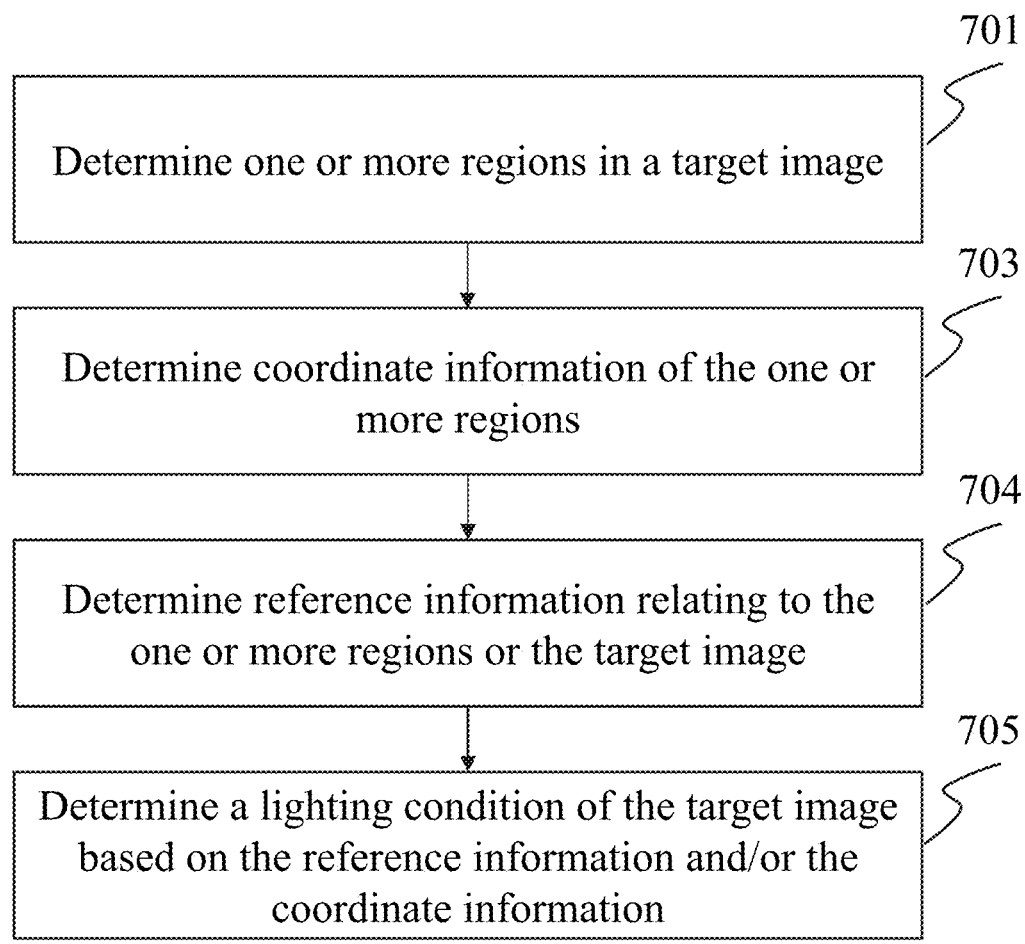
FIG. 7 is a flowchart illustrating an exemplary process for determining a lighting condition of an image according to some embodiments of the present disclosure.

FIG. 7 is a flowchart illustrating an exemplary process 700 for determining the lighting condition of an image according to some embodiments of the present disclosure. Process 700 may be performed by the lighting condition module 310 as exemplified in FIGS. 3-4 and the description thereof. In some embodiments, one or more operations of process 700 for determining the lighting condition of the image may be performed by the computing device 200A as illustrated in FIG. 2A, or the mobile device 200B as illustrated in FIG. 2B. In some embodiments, 602 of process 600 may be performed according to process 700.

At 701, one or more regions in the target image may be determined. In some embodiments, one or more operations of 701 may be performed by region determination unit 311 as exemplified in FIG. 4 and the description thereof.

Merely by way of example, one or more rectangular (or square) regions in an image may be determined. The target image may be divided into N equal parts along its length, and M equal parts along its width to provide M*N rectangle regions. The numbers M and N may be the same or different. For example, as shown in FIG. 16 the image is divided into six equal parts along its length, and six equal parts along its width, and the image is divided into thirty-six rectangular (or square) regions.

At 703, coordinate information of the one or more regions may be determined. In some embodiments, one or more operations of the determination of the coordinate information of the one or more regions may be performed by the coordinate determination unit 313 as exemplified in FIG. 4 and the description thereof.

Figure 19:
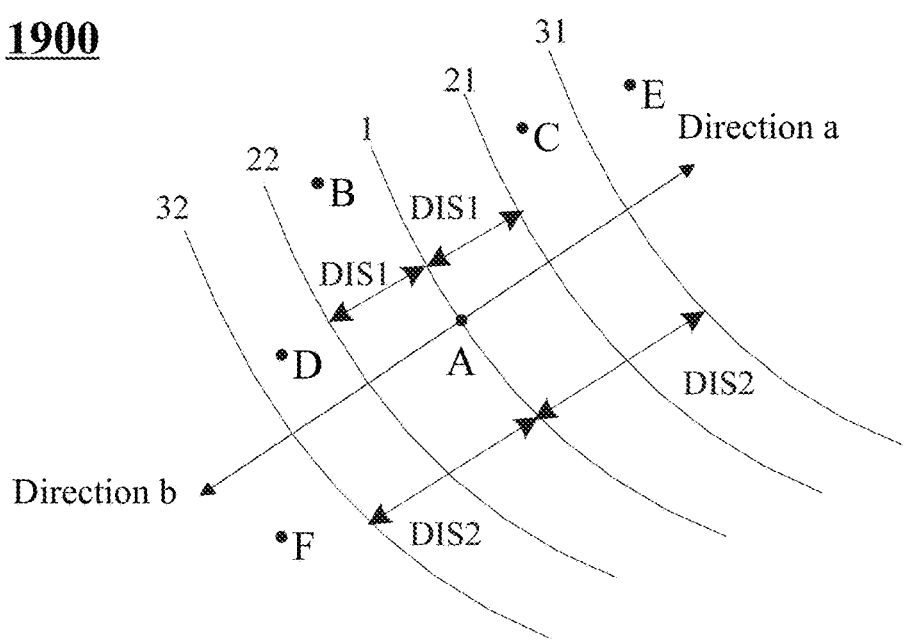
FIG. 19 is an exemplary temperature curve, two first distance curves, and two second distance curves according to some embodiments of the present disclosure.

Coordinate information may include a coordinate system corresponding to a color model used to describe an image. The color model may be an RGB color model, a CMYK color model, an XWZ color model, etc. The coordinate system may be a one-dimensional coordinate system or a multi-dimensional coordinate system (e.g., a two-dimensional coordinate system). In some embodiments, the coordinate system may be determined by the coordinate determination unit 313 as exemplified in FIG. 4 and the description thereof. In some embodiments, various curves may be presented in the coordinate system. For instance, a reference color-temperature curve, two first distance color-temperature curves, and two second distance color-temperature curves may be presented on the coordinate system as shown in FIG. 19.

In some embodiments, the coordinate system may be a two-dimensional coordinate system with a horizontal axis and a vertical axis. For example, the horizontal axis may correspond to the red color component and the vertical axis may correspond to the green color component.

Coordinate information may include coordinates of one or more points in the coordinate system. A point of the one or more points may correspond to a region of the one or more regions. The coordinates of a point may be determined based on one or more evaluation parameters of the corresponding region. More description of the evaluation parameters may be found elsewhere in the present disclosure. See, for example, FIG. 8 and the description thereof.

In some embodiments, the horizontal and vertical axes of the coordinate system may be based on the red color component (corresponding to an R value), the green color component (corresponding to a G value), and the blue color component (corresponding to a B value). For example, the horizontal and the vertical axes of the coordinate system may represent G/R and G/B values, respectively, or R/G and B/G values, respectively, or logarithm values of G/R and G/B, respectively, or logarithm values of R/G and B/G, etc. More description regarding the coordinate system may be found elsewhere in the present disclosure. See, for example, FIG. 3 and the description thereof.

At 704, reference information relating to the one or more regions or the target image may be determined. In some embodiments, one or more operations of the determination of the reference information may be performed by vector determination sub-unit 315 and/or near infrared intensity determination sub-unit 317 as exemplified in FIG. 4 and the description thereof.

In some embodiments, the reference information may include a color-temperature vector. The color-temperature vector may be determined based on one or more color components of the target image. The direction of the color-temperature vector may be from an element of a low color temperature toward an element of a high color temperature. An element may represent a cluster of points corresponding to a region in the image.

In some embodiments, the reference information may include a near infrared intensity of the region or the target image. In some embodiments, the near infrared intensity may be detected by a sensor.

At 705, a lighting condition of the target image may be determined based on the reference information and/or the coordinate information. In some embodiments, one or more operations of the determination of the lighting condition may be performed by lighting condition determination unit 319 as exemplified in FIG. 4 and the description thereof.

Figure 10A:
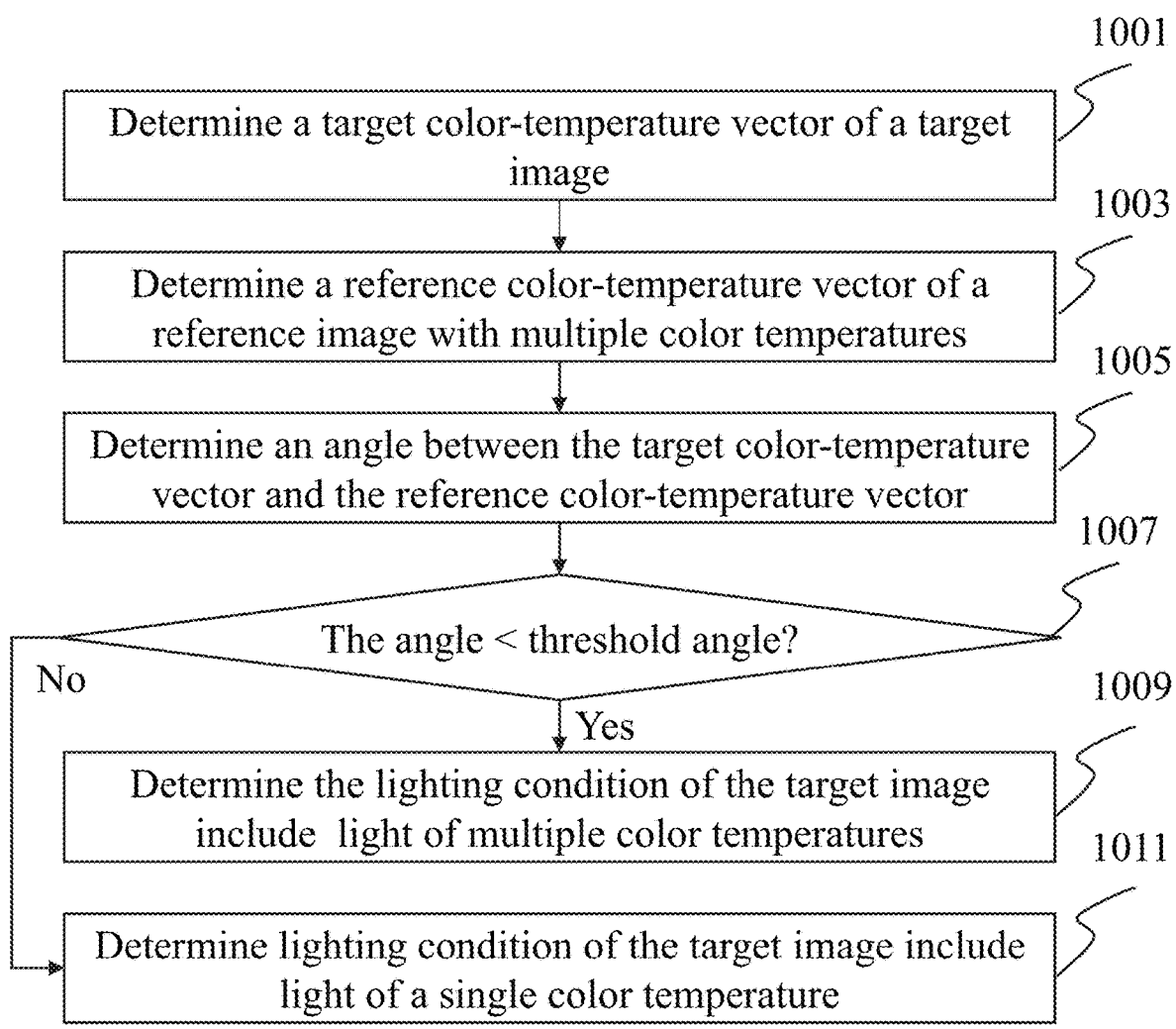
FIGS. 10A and 10B are flowcharts illustrating exemplary processes for determining a lighting condition of an image according to some embodiments of the present disclosure.
Figure 10B:
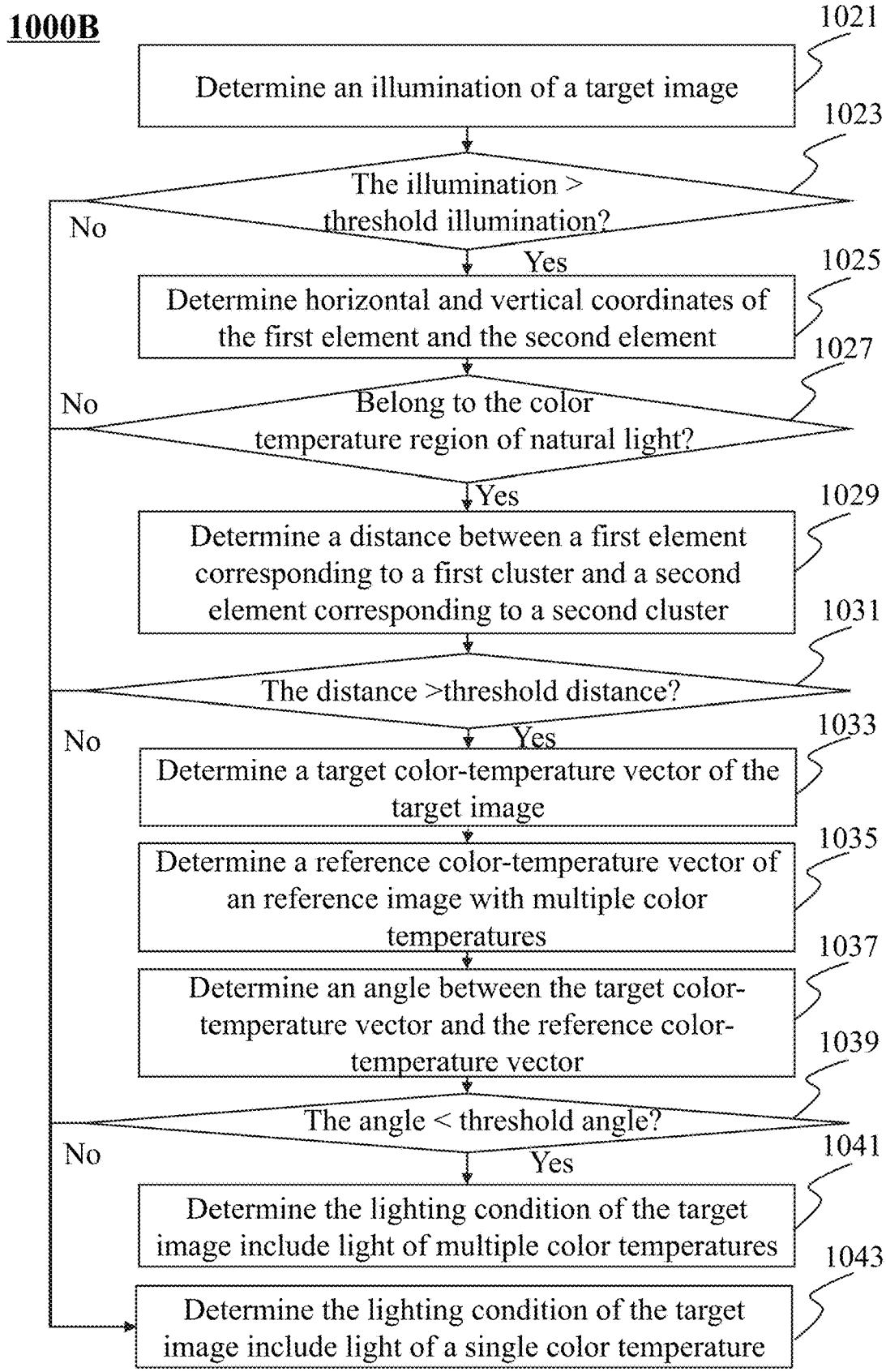

In some embodiments, the lighting condition of the target image may be determined based on illumination of the target image, a color-temperature vector of the target image, and a reference color-temperature vector of a reference image as exemplified in FIGS. 10A and 10B and the description thereof.

Figure 11:
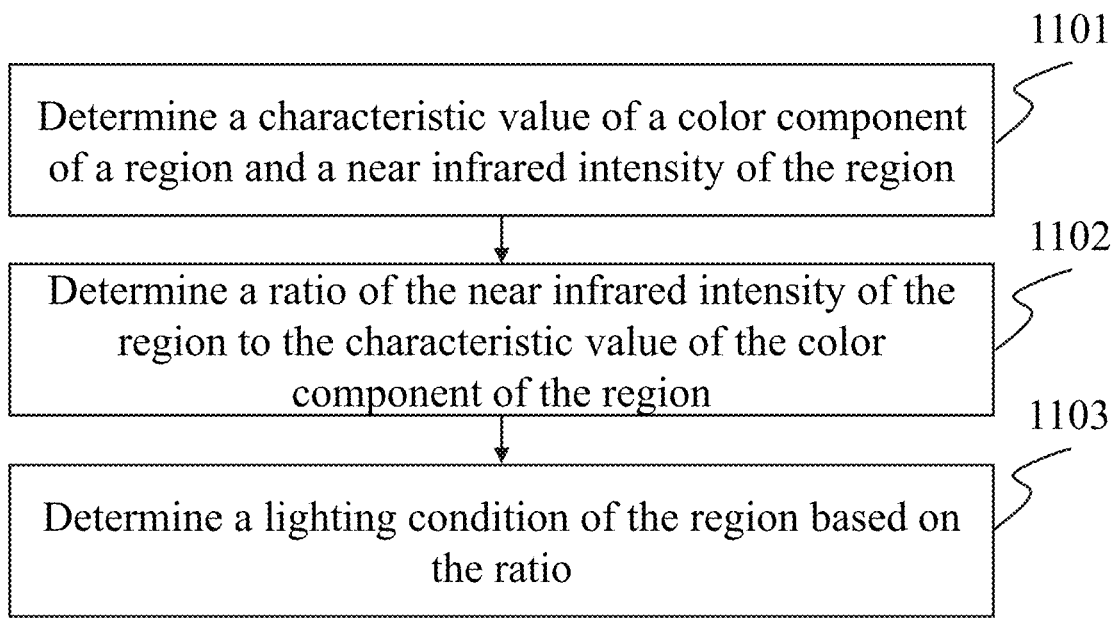
FIG. 11 is a flowchart illustrating an exemplary process for determining a lighting condition of an image according to some embodiments of the present disclosure.

In some embodiments, the lighting condition of a region may be determined based on a characteristic value (e.g., average value) of a color component (e.g., G value) of the region and near infrared intensity of the region as exemplified in FIG. 11 and the description thereof. For instance, the fluorescent lamp and natural light may be distinguished on a near infrared spectrogram, and the near infrared intensity of the region may reflect the lighting condition of the region. The lighting condition of an image may be determined based on the lighting condition of the regions of the image.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. For example, coordinate systems with different horizontal and vertical axes may be determined in 703. The horizontal and vertical axes of the coordinate system may be G/R and G/B values, respectively, or R/G and B/G values, respectively, or logarithm values of G/R and G/B, respectively, or R/G and B/G, etc. However, those variations and modifications may not depart from the protecting of some embodiments of the present disclosure.

Figure 8:
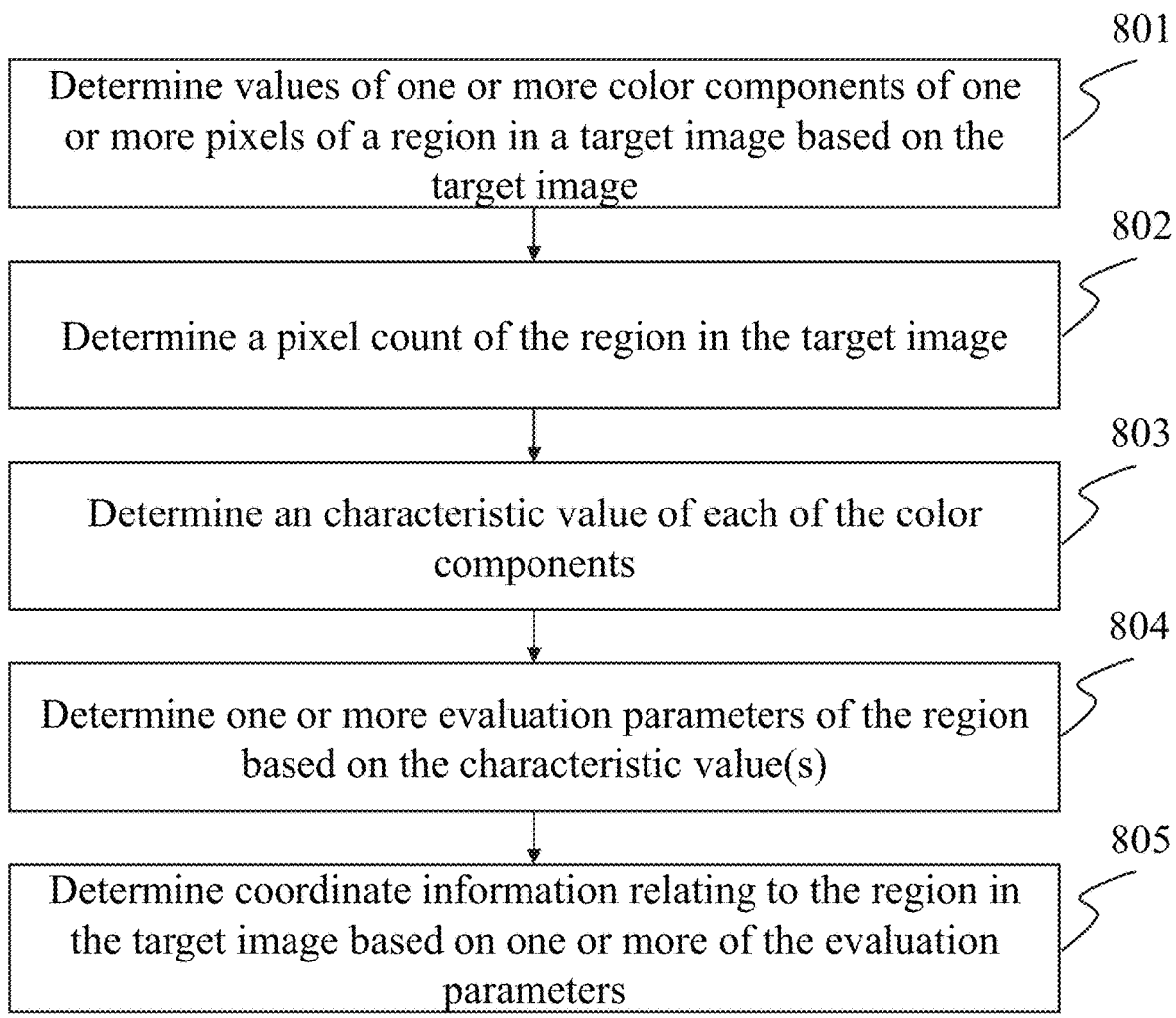
FIG. 8 is a flowchart illustrating an exemplary process for determining coordinate information of a region according to some embodiments of the present disclosure.

FIG. 8 is a flowchart illustrating an exemplary process 800 for determining coordinate information of a region according to some embodiments of the present disclosure. In some embodiments, process 800 may be performed by the coordinate determination unit 313 as exemplified in FIG. 4 and the description thereof. In some embodiments, one or more operations of process 800 for determining the coordinate information of the region may be performed by the computing device 200A as illustrated in FIG. 2A, or the mobile device 200B as illustrated in FIG. 2B. In some embodiments, 703 of process 700 may be performed according to process 800. A plurality of color models may be used based on the operations described in connection with FIG. 8, for example, an RGB color model, a CMYK color model, an XWZ color model, or the like. Process 800 is described below with reference to an RGB color model for illustration purposes, and not intended to limit the scope of the present disclosure.

At 801, the values of one or more color components of one or more pixels of a region in a target image may be determined based on the target image. For instance, the values of one or more color components of one or more pixels of a region in a target image may be determined using MATLAB.

In an RGB color model, the one or more color components may be the red color component, the green color component, and the blue color component. The value of the red color component of a pixel may be described as an R value. The value of the green color component of a pixel may be described as a G value. The value of the blue color component of a pixel may be described as a B value. For example, a region in an image includes 100 pixels, and an R value, a G value, and a B value may be determined for each of the 100 pixels.

At 802, a pixel count of the region in the target image may be determined.

At 803, a characteristics value of each of the color components may be determined with respect to the region. In some embodiments, the characteristic value of a color component of the region may be an average of the values of the color component of the pixels in the region. For example, an average R value of the red color component, an average G value of the green color component, and/or an average B value of the blue color component of the region in the target image may be determined.

In some embodiments, an average value of red color component of region i (i.e., average R value of region i, $R_{avg}^i$), an average value of green color component of region i (i.e., average G value of region i, $G_{avg}^i$), and an average value of blue color component of region i (i.e., average B value of region i, $B_{avg}^i$) may be determined as follows:

$$\begin{cases} R_{avg}^i = \dfrac{R_{sum}^i}{Q_i} \\ G_{avg}^i = \dfrac{G_{sum}^i}{Q_i} \\ B_{avg}^i = \dfrac{B_{sum}^i}{Q_i} \end{cases} \quad (1)$$

where $Q_i$ is the pixel count of the region i of the target image. $R_{sum}^i$, $G_{sum}^i$, and $B_{sum}^i$ are the sums of R values, G values, and B values of all pixels of the region i of the target image, respectively.

At 804, one or more evaluation parameters of the region may be determined based on the characteristic value(s). Merely by way of example, the evaluation parameter may be determined based on the average R value, the average B value, and the average G value. For example, an evaluation parameter of the region may be the average R value, the average G value, or the average B value of a region. As another example, an evaluation parameter of the region may be a ratio of the average G value to the average R value (i.e., G/R), the average G value to the average B value (i.e., G/B), the average R value to the average G value (i.e., R/G), or the average B value to the average G value (i.e., B/G) of the region. As still another example, an evaluation parameter may be an average logarithm of G/R, an average logarithm of G/B, an average logarithm of R/G, or an average logarithm of B/G of the region.

Merely by way of example, two evaluation parameters $P_1$ and $P_2$ of region i may be determined based on the following equations:

$$\begin{cases} P_1 = \dfrac{G_{avg}^i}{R_{avg}^i} \\ P_2 = \dfrac{G_{avg}^i}{B_{avg}^i} \end{cases} \quad (2)$$

where $R_{avg}^i$, $G_{avg}^i$, and $B_a$c, are average values of the red, green, and blue color components of the region i of the target image.

At 805, coordinate information relating to the region in the target image may be determined based on one or more of the evaluation parameters.

In some embodiments, the coordinate information relating to the region in the target image may be coordinates of a point corresponding to the region. Horizontal and vertical coordinates of the point may be determined based on one or more of the evaluation parameters. For example, the point may be $$\left(\dfrac{G_{avg}^i}{B_{avg}^i}, \dfrac{G_{avg}^i}{R_{avg}^i}\right), \left(\dfrac{G_{avg}^i}{R_{avg}^i}, \dfrac{G_{avg}^i}{B_{avg}^i}\right), \left(\log\dfrac{G_{avg}^i}{B_{avg}^i}, \log\dfrac{G_{avg}^i}{R_{avg}^i}\right),$$

-continued $$\left(\log\frac{G_{avg}^i}{R_{avg}^i}, \log\frac{G_{avg}^i}{B_{avg}^i}\right),$$

or the like.

It should be noted that the above description of process 800 is merely provided for the purposes of illustration, and not intended to be understood as the only embodiment. For persons having ordinary skills in the art, various variations and modifications may be conduct under the teaching of some embodiments of the present disclosure. For example, different evaluation parameters may be determined in 804. As another example, a characteristic value of a color component may be a value other than an average of the values of the color component of the pixels in the region. However, those variations and modifications may not depart from the protecting of some embodiments of the present disclosure.

FIG. 9 is a flowchart illustrating an exemplary process 900 for determining a color-temperature vector according to some embodiments of the present disclosure. Process 900 may be performed by the vector determination sub-unit 315 as exemplified in FIG. 4 and the description thereof. In some embodiments, one or more operations of process 900 for determining the color-temperature vector may be performed by the computing device 200A as illustrated in FIG. 2A, or the mobile device 200B as illustrated in FIG. 2B. In some embodiments, 704 of process 700 may be performed according to process 900. A plurality of color models may be used based on the operations exemplified in FIG. 9 and the description thereof, for example, an RGB color model, a CMYK color model, an XWZ color model, or the like. Process 900 is described below with reference to an RGB color model for illustration purposes, and not intended to limit the scope of the present disclosure. Process 900 is described below with reference to a target image for illustration purposes, and not intended to limit the scope of the present disclosure. For example, a reference image may be processed according to process 900.

At 901, a plurality of clusters of points corresponding to a plurality of regions in a target image may be determined.

The points may be determined based on coordinate information of the plurality of regions in the target image as exemplified in FIG. 8 and the description thereof. The points may be clustered based on horizontal and vertical coordinates of the points according to any suitable technique or any combination thereof including, for example, a partitioning technique (e.g., a k-means algorithm, a k-medoids algorithm, a clarans algorithm, etc.), a hierarchical technique (e.g., a Balanced Iterative Reducing and Clustering using Hierarchies (BIRCH) algorithm, a Clustering Using REpresentatives (CURE) algorithm, a RObust Clustering using linKs (ROCK) algorithm, etc.), a density-based technique (e.g., a Density-Based Spatial Clustering of Applications with Noise (DBSCAN) algorithm, a Ordering Points To Identify the Clustering Structure (OPTICS) algorithm, etc.), a graph theory clustering technique, a grid-based technique (e.g., a STatistical INformation Grid-based method (STING) algorithm, etc.), a model-based technique (e.g., a neural network algorithm), or the like.

In some embodiments, two clusters of points corresponding to the plurality of regions in the target image may be determined. For example, a plurality of points corresponding to a plurality of regions in an image may be determined and a first cluster and a second cluster may be determined based on the plurality of points.

In some embodiments, more than two (e.g., three, four, five etc.) clusters of points corresponding to the plurality of regions in the target image may be determined. Among the more than two clusters, a first cluster and a second cluster may be determined based on an algorithm or a user input. In the following process, a color-temperature vector may be determined based on the first cluster and the second cluster.

At 902, a first element corresponding to a first cluster of the plurality of clusters may be determined. The first element corresponding to the first cluster of the plurality of clusters may be a center point, a boundary point, a random point within the first cluster, or the like.

At 903, a second element corresponding to a second cluster of the plurality of clusters may be determined. The second element corresponding to the second cluster of the plurality of clusters may be a center point, a boundary point, a random point within the second cluster, or the like.

The first element or the second element may be determined based on an algorithm or based on a user input. The technique used to determine the first element and the second element may be the same or different. The elements corresponding to the clusters may be determined based on any suitable algorithm or any combination thereof including, for example, a mean shift algorithm, a simulated annealing algorithm (SAA), etc. For example, the first element and the second element may be determined according to a mean shift algorithm. As another example, the first element may be determined according to a mean shift algorithm and the second element may be determined according to a simulated annealing algorithm.

At 904, a color-temperature vector based on the first element and the second element may be determined. The color-temperature vector may have a starting point and an end point. The starting point may correspond to the first element with a first color temperature, and the end point may correspond to the second element with a second color temperature. The first color temperature of the first element and the second color temperature of the second element may be the same or different. For instance, the first color temperature of the first element may be lower than the second color temperature of the second element. In some embodiments, the direction of the color-temperature vector may be from the first element with the relatively low color temperature to the second element with the relatively high color temperature. For brevity, the direction of the color-temperature vector may be described as from a low color temperature to a high color temperature. It is understood that the "low" and "high" here are used as relative terms, not absolute terms. In some embodiments, the starting point may correspond to an element with a relatively high color temperature, and the end point may correspond to an element with a relatively low color temperature; the direction of the color-temperature vector may be from the element with the relatively low color temperature to the element with the relatively high color temperature, or from a low color temperature to a high color temperature for brevity.

It should be noted that the above description of process 900 is merely provided for the purposes of illustration, and not intended to be understood as the only embodiment. For persons having ordinary skills in the art, various variations and modifications may be conduct under the teaching of some embodiments of the present disclosure. For example, 902 and 903 may perform in a reversed order. However, those variations and modifications may not depart from the protecting of some embodiments of the present disclosure.

FIG. 10A is a flowchart illustrating an exemplary process 1000A for determining a lighting condition of an image according to some embodiments of the present disclosure. Process 1000A may be performed by the lighting condition determination unit 319 as exemplified in FIG. 4 and the description thereof. In some embodiments, one or more operations of process 1000A for determining the lighting condition of the image may be performed by the computing device 200A as illustrated in FIG. 2A, or the mobile device 200B as illustrated in FIG. 2B. In some embodiments, 705 of process 700 may be performed according to process 1000A.

At 1001, a target color-temperature vector of a target image may be determined. In some embodiments, the target color-temperature vector of the image may be determined in process 900. The direction of the target color-temperature vector may be from a low color temperature to a high color temperature.

At 1003, a reference color-temperature vector of a reference image with multiple color temperatures may be determined. As used herein, the reference image with multiple color temperatures may be an image whose lighting condition may include light of multiple color temperatures. In some embodiments, the reference color-temperature vector of the reference image may be determined according to a method as described in process 900. The coordinates of points of the regions in the reference image may distribute approximately along a straight line in the coordinate system (as illustrated in FIG. 17). The direction of the reference color-temperature vector may be from a low color temperature to a high color temperature as described in process 900.

At 1005, an angle between the target color-temperature vector and the reference color-temperature vector may be determined. The angle may indicate a similarity of lighting condition between the target image and the reference image. The smaller the angle between the target color-temperature vector and the reference color-temperature vector is, the greater the similarity of lighting condition between the target image and the reference is.

At 1007, whether the angle is less than a threshold angle may be determined. In some embodiments, the threshold angle may be set by the white balance adjustment device 120. For instance, the threshold angle may be set by the white balance adjustment device 120 according to, e.g., a default setting of the white balance adjustment device 120. In some embodiments, the threshold angle may be set based on a user input. In some embodiments, the threshold angle may be 1°, or 3°, or 5°, or 8°, or 10°, or 12°, or 15°, etc. In some embodiments, the threshold angle may be less than 3°, or less than 5°, or less than 8°, or less than 10°, or less than 12°, or less than 15°, etc. When the angle is smaller than the threshold angle, 1009 may be performed. When the angle exceeds the threshold angle, 1011 may be performed. The situation when the angle is equal to the threshold angle may be grouped with the situation when the angle is smaller than the threshold angle, or with the situation when the angle exceeds the threshold angle. For instance, when the angle is equal to the threshold angle, 1009 may be performed. As another example, when the angle is equal to the threshold angle, 1011 may be performed.

At 1009, the lighting condition of the target image may be determined to include light of multiple color temperatures. When the angle between the target color-temperature vector and the reference color-temperature vector is less than the threshold angle, the lighting condition of the target image may be substantially similar to the lighting condition of the reference image. Accordingly, the lighting condition of the target image may be considered to include light of the multiple color temperatures as the reference image. For example, the target image may be captured in the scene of sunshine (e.g., direct sunlight) and blue sky. As another example, the target image may be captured in the scene of sunshine and shadow of a subject. As still another example, the target image may be captured in the scene of sunshine, shadow of a subject and blue sky. In some embodiments, the color temperature of a light may be different in the scenes of different times, different seasons, different latitudes and longitudes, or different altitudes. For example, the color temperature of a sunlight at a same time may be different in different geographical locations (e.g., in Tibetan Plateau and in north China plain the color temperature of light may be different at a same time).

At 1011, lighting condition of the image may be determined to include light of a single color temperature. When the angle exceeds the threshold angle, the lighting condition of the target image may be different from the lighting condition of the reference image. Accordingly, the lighting condition of the target image may be consider to include light of a single color temperature.

FIG. 10B is a flowchart illustrating an exemplary of process 1000B for determining a lighting condition of an image according to some embodiments of the present disclosure. Process 1000B may be performed by the lighting condition determination unit 319 as exemplified in FIG. 4 and the description thereof. In some embodiments, one or more operations of process 1000B for determining the lighting condition of the image may be performed by the computing device 200A as illustrated in FIG. 2A, or the mobile device 200B as illustrated in FIG. 2B. In some embodiments, 705 of process 700 may be performed according to process 1000B. Process 1000B is described below with reference to nature light for illustration purposes, and not intended to limit the scope of the present disclosure.

At 1021, an illumination of a target image may be determined. The illumination of the target image may illustrate the luminous flux per unit area on an intercepting surface of the area of a light-sensitive component of the imaging device when the target image is captured at any given point. The illumination of the target image may be determined based on a shooting shutter time, a gain parameter, and an aperture of a camera when the target image is captured.

At 1023, whether the illumination is more than a threshold illumination may be determined. The threshold illumination may be set by the white balance adjustment device 120. For instance, the threshold illumination may be set by the white balance adjustment device 120 according to, e.g., a default setting of the white balance adjustment device 120. In some embodiments, the threshold illumination may be set based on a user input. When the illumination exceeds the threshold illumination, 1025 may be performed. When the illumination is below the threshold illumination, 1043 may be performed. The situation when the illumination is equal to the threshold illumination may be grouped with the situation when the illumination exceeds the threshold illumination, or with the situation when the illumination is below the threshold illumination. For instance, when the illumination is equal to the threshold illumination, 1025 may be performed. As another example, when the illumination is equal to the threshold illumination, 1043 may be performed.

At 1025, horizontal and vertical coordinates of the first element and the second element may be determined. In some embodiments, the horizontal and vertical coordinates of the first element and the second element may be retrieved from the coordinate information the two elements. The coordinate information of the two elements may be determined according to a method as described in process 900 as illustrated in FIG. 9.

At 1027, a determination may be made as to whether the color temperature of the first element or the color temperature of the second element belongs to the color temperature range of natural light may be determined. When the color temperatures of the two elements are both in the color temperature range of natural light, 1029 may be performed. When the color temperature of at least one of the two elements is outside of the color temperature range of the natural light, 1043 may be performed.

At 1029, a distance between a first element corresponding to a first cluster and a second element corresponding to a second cluster may be determined. The distance between the first element and the second element may be a straight-line distance in the coordinate system. The distance between the first element and the second element may be determined based on horizontal and vertical coordinates of the first elements and the second element. The distance between the first element and the second element may be determined based on a measurement or some other techniques. In some embodiments, the first element and the second element may be determined according to the method as described in process 900 as illustrated in FIG. 9.

At 1031, whether the distance is more than a threshold distance may be determined. When the distance is more than the threshold distance, 1033 may be performed. When the distance is below the threshold distance, 1043 may be performed. The situation when the distance is equal to the threshold distance may be grouped with the situation when the distance exceeds the threshold distance, or with the situation when the distance is below the threshold distance. For instance, when the distance is equal to the threshold distance, 1029 may be performed. As another example, when the distance is equal to the threshold distance, 1043 may be performed.

At 1033, a target color-temperature vector of an image may be determined. At 1035, a reference color-temperature vector of a reference image with multiple color temperatures may be determined. In some embodiments, the target color-temperature vector and the reference color-temperature vector may be determined according to a method as described in process 900 as illustrated in FIG. 9. In some embodiments, 1033 may be performed as described with respect to 1001, and 1035 may be performed as described with respect to 1003.

At 1037, an angle between the target color-temperature vector and the reference color-temperature vector may be determined. In some embodiments, 1037 may be performed as described with respect to 1005.

At 1039, a determination may be made as to whether the angle is less than a threshold angle. When the angle is smaller than the threshold angle, 1041 may be performed. When the angle exceeds the threshold angle, 1043 may be performed. The situation when the angle is equal to the threshold angle may be grouped with the situation when the angle is smaller than the threshold angle, or with the situation when the angle exceeds the threshold angle. For instance, when the angle is equal to the threshold angle, 1041 may be performed. As another example, when the angle is equal to the threshold angle, 1043 may be performed.

At 1041, the lighting condition of the target image may be determined to include light of multiple color temperatures. When the illumination of the target image exceeds the threshold illumination, the distance of the two elements is more than the threshold distance, the two elements are considered to belong to the color temperature range of natural light. For such two elements considered to belong to the color temperature range of natural light, if the angle between the target color-temperature vector (determined by the two elements) and the reference color-temperature vector is less than a threshold angle, lighting condition of the target image may include light of multiple color temperatures.

At 1043, the lighting condition of the target image may be determined to include light of a single color temperature.

It should be noted that the above description of processes 1000A and 1000B are merely provided for the purposes of illustration, and not intended to be understood as the only embodiment. For persons having ordinary skills in the art, various variations and modifications may be conduct under the teaching of some embodiments of the present disclosure. For example, 1033 and 1035 may perform in a reversed order. However, those variations and modifications may not depart from the protecting of some embodiments of the present disclosure.

FIG. 11 is a flowchart illustrating an exemplary process 1100 for determining the lighting condition of an image according to some embodiments of the present disclosure. Process 1100 may be performed by the lighting condition module 310 as exemplified in FIG. 4 and the description thereof. In some embodiments, one or more operations of process 1100 for determining the lighting condition of the image may be performed by the computing device 200A as illustrated in FIG. 2A, or the mobile device 200B as illustrated in FIG. 2B. In some embodiments, 705 of process 700 may be performed according to process 1100. A plurality of color models may be used in process 1100, then a color component may be determined based on the color mode. For example, a RGB color model may be used and the color component may be the red color component, the green color component, and/or the blue color component. As another example, an XWZ color model may be used and the color component may be an X component, a W component, and/or a Z component. As still another example, a CMYK color model may be used and the color component may be C component, an M component, a Y component and/or a K component. Process 1100 is described below with reference to an RGB color model for illustration purposes, and not intended to limit the scope of the present disclosure.

In some embodiments, the lighting condition of different regions of an image may be the same. In such a situation, the lighting condition of the image may include the lighting condition of the different regions. In some embodiments, the lighting condition of different regions of an image may be different. For example, the lighting condition of a first region of an image may include light of a single color temperature, the lighting condition of a second region of an image may include light of multiple color temperatures. In such a situation, the lighting condition of the image may include light of multiple color temperatures and light of a single color temperature.

At 1101, a characteristic value of a color component of a region and the near infrared intensity of the region may be determined.

Merely by way of example, the characteristic value may be an average value. For example, the characteristic value of the color component may be an average R value of the red color component, an average G value of the green color component, or an average B value of the blue color component of the pixels in the region. In some embodiments, the characteristic value of a color component of a region may be determined by the coordinate determination unit 313 as exemplified in FIG. 4 and the description thereof. More description regarding the characteristic value of a color component of a region may be found elsewhere in the present disclosure. See, for example, relevant descriptions with reference to FIG. 3.

The near infrared intensity of the region may be determined by the near infrared intensity determination sub-unit 317 as exemplified in FIG. 4 and the description thereof. The near infrared intensity of different regions of an image may be the same or different. In some embodiments, the difference of the near infrared intensity of different regions may be ignored. For example, the near infrared intensity of different regions of an image may be determined as equal to the near infrared intensity of the image.

In some embodiments, a near infrared intensity of an image, or a portion thereof, may be determined based on a voltage of a photo sensor of an imaging device, a shutter time of the imaging device, and a magnification of the imaging device that is used to capture the image. For example, the near infrared intensity of a region of an image (i.e., avgNIR) may be determined based on the following equation:

$$\text{avgNIR} = \text{rawNIR} \times T_{shut} \times G_{gain}, \quad (3)$$

where rawNIR is a voltage of a photo sensor of an imaging device (e.g., the imaging device 110) when the image is captured by the imaging device, $T_{shut}$ is the shutter time of the imaging device (e.g., the imaging device 110) when the image is captured, and $G_{gain}$ is the magnification of the imaging device (e.g., the imaging device 110) when the image is captured by the imaging device.

At 1102, a ratio of the near infrared intensity of the region to the characteristic value of the color component of the region may be determined.

In some embodiments, a ratio $H_i$ of the near infrared intensity of region i to the characteristic value of the color component of region i may be determined based on one of the following equation s (4)-(6):

$$H_i = \frac{avgNIR}{R_{avg}^i} \quad (4)$$

where $R_{avg}^i$ is average R value of the R values of the pixels of region i;

$$H_i = \frac{avgNIR}{G_{avg}^i}, \quad (5)$$

where $G_{avg}^i$ is an average G value of the G values of the pixels of region i;

$$H_i = \frac{avgNIR}{B_{avg}^i}, \quad (6)$$

where $B_{avg}^i$ is an average B value of the B values of the pixels of region i.

At 1103, the lighting condition of the region may be determined based on the ratio. The smaller the ratio is, the greater the possibility that the lighting condition of the region is artificial light is. In some embodiments, a threshold ratio may be used to determine the lighting condition of the region. When the ratio $H_i$ is smaller than the threshold ratio, the lighting condition of the region may be considered to include artificial light. When the ratio $H_i$ exceeds the threshold ratio, the lighting condition of the region may be considered to include natural light. The situation when the ratio $H_i$ is equal to the threshold ratio may be grouped with the situation when the ratio $H_i$ is smaller than the threshold ratio, or with the situation when the ratio $H_i$ exceeds the threshold ratio. For instance, when the ratio $H_i$ is equal to the threshold ratio, the lighting condition of the region may be considered to include artificial light. As another example, when the ratio $H_i$ is equal to the threshold ratio, the lighting condition of the region may be considered to include natural light.

It should be noted that the above description of process 1100 is merely provided for the purposes of illustration, and not intended to be understood as the only embodiment. For persons having ordinary skills in the art, various variations and modifications may be conduct under the teaching of some embodiments of the present disclosure. For example, a near infrared intensity of an image may be obtained in 1101. As another example, one or more threshold ratios may be set with respect to different ratios (e.g., a first ratio $H_i$ of the near infrared intensity of region i to the characteristic value of a first color component, a second ratio $H_i$ of the near infrared intensity of region i to the characteristic value of a second color component, etc.). However, those variations and modifications may not depart from the protecting of some embodiments of the present disclosure.

FIG. 12 is a flowchart illustrating an exemplary process 1200 for determining a white balance gain of a target image according to some embodiments of the present disclosure. Process 1200 may be performed by the white balance gain determination module 323 as descried in connection with FIG. 3. In some embodiments, one or more operations of process 1200 for determining the white balance gain may be performed by the computing device 200A as illustrated in FIG. 2A, or the mobile device 200B as illustrated in FIG. 2B. In some embodiments, 603 of process 600 may be performed according to process 1200.

At 1201, an angle between a target color-temperature vector and a reference color-temperature vector may be obtained. For example, the angle may be denoted as a.

At 1202, a first white balance gain of the target image may be determined according to a first white balance gain algorithm. In 1203, a second white balance gain of the target image may be determined according to a second white balance gain algorithm. The determination of the first white balance gain and the second white balance gain may be performed by the white balance gain determination unit 323 as exemplified in FIG. 5 and the description thereof.

The first white balance gain algorithm and the second white balance gain algorithm may be the same or different. In some embodiments, the first white balance gain algorithm may be a single-color-temperature algorithm and the second white balance gain algorithm may be a multi-color-temperature algorithm. For example, the first white balance gain algorithm may be a dynamic threshold algorithm and the second white balance gain algorithm may be a grey world algorithm.

Merely by way of example with reference to an RGB color model, each of the first white balance gain and the second white balance gain may include a red gain of the red color component (e.g., $R_{gain}$), a green gain of the green color component (e.g., $G_{gain}$), and a blue gain of the blue color component (e.g., $B_{gain}$). For example, the first white balance gain may include $R_{gain1}$, $G_{gain1}$, and $B_{gain1}$. The second white balance gain may include $R_{gain2}$, $G_{gain2}$, and $B_{gain2}$. For instance, a first green gain of the green component of an image may be determined according to the first white balance gain algorithm, and a second green gain of the green component of the image may be determined according to the second white balance gain algorithm. In some embodiments, the first green gain and the second green gain may be 1 (i.e., $G_{gain1}=1$ and $G_{gain2}=1$). In other words, the G value of the green component of the image may remain unchanged while the white balance of the image is adjusted.

At 1204, a multi-color-temperature parameter based on the angle may be determined. In some embodiments, the multi-color-temperature parameter $P_{mct}$ may be a trigonometric function of the product of the angle and a coefficient k. For instance, the multi-color-temperature parameter $P_{mct}$ may be determined based on the following equation:

$$P_{mct}=\cos(k\alpha). \quad (7)$$

In some embodiments, the coefficient k may be set by the white balance adjustment device 120. For instance, the coefficient k may be set by the white balance adjustment device 120 according to, e.g., a default setting of the white balance adjustment device 120. In some embodiments, the coefficient k may be set based on a user input.

At 1205, a first gain weight of the first white balance gain and a second gain weight of the second white balance gain may be determined based on the multi-color-temperature parameter. For instance, the first gain weight of the first white balance gain $W_1$ and the second gain weight of the second white balance gain $W_2$ may be any value that satisfy the following equation:

$$P_{mct} = \frac{W_2}{W_2 + W_1}. \quad (8)$$

In other words, the ratio of the second gain weight to a sum of the first gain weight and the second weight may equal the multiple color temperature parameter.

The first gain weight and the second gain weight may be any values that satisfy equation (8). For example, a second gain weight may be $\cos(k\alpha)$ and a first gain weight may be $1-\cos(k\alpha)$. In some embodiments, the second gain weight corresponding to the grey world algorithm may be $\cos(k\alpha)$, and the first gain weight corresponding to the dynamic threshold algorithm may be $1-\cos(k\alpha)$.

At 1206, a white balance gain of the target image may be determined based on the first gain weight, the second gain weight, the first white balance gain, and the second white balance gain. Merely by way of example with reference to an RGB color model, the white balance gain may include a red gain of the red color component (e.g., $R_{gain}$), a green gain of the green color component (e.g., $G_{gain}$), and/or a blue gain of the blue color component (e.g., $B_{gain}$).

In some embodiments, a red gain of the red color component and a blue gain of a blue color component of the target image or a region of the target image may be determined based on the following formulas:

$$\begin{cases} R_{gain} = (1-\cos(k\alpha)) \times R_{gain1} + \cos(k\alpha) \times R_{gain2} \\ B_{gain} = (1-\cos(k\alpha)) \times B_{gain1} + \cos(k\alpha) \times B_{gain2} \end{cases}. \quad (9)$$

An image may be adjusted based on the white balance gain. In some embodiments, in order to maintain the brightness of the image, the green component of the image may remain unchanged, the red color component may be adjusted based on the red gain of the red color component (e.g., $R_{gain}$) and the blue component may be changed based on the blue gain of the blue component (e.g., $B_{gain}$).

It should be noted that the above description of process 1200 is merely provided for the purposes of illustration, and not intended to be understood as the only embodiment. For persons having ordinary skills in the art, various variations and modifications may be conduct under the teaching of some embodiments of the present disclosure. For example, 1202, 1203, and 1204 may perform in an order different from the order illustrated in FIG. 12, e.g., in a reserved order compared to the order illustrated in FIG. 12. However, those variations and modifications may not depart from the protecting of some embodiments of the present disclosure.

Figure 13:
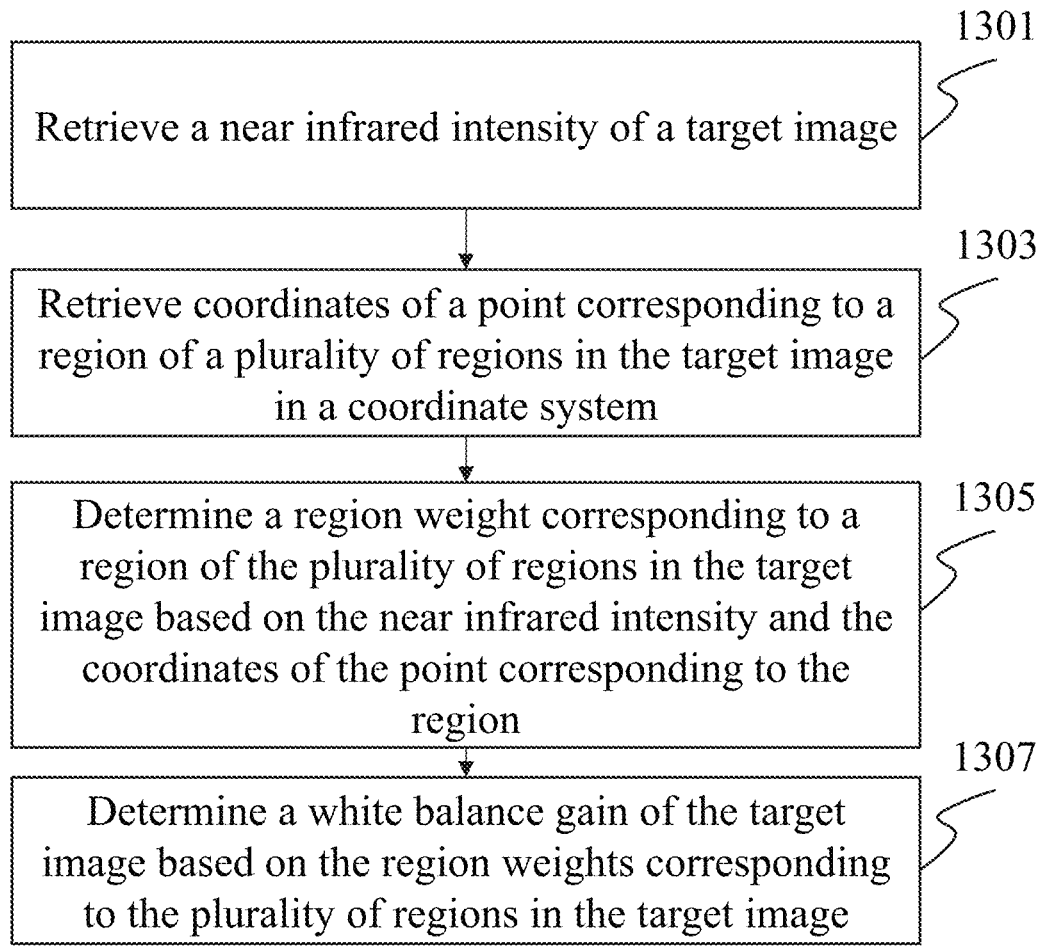
FIG. 13 is a flowchart illustrating an exemplary process for determining a white balance gain according to some embodiments of the present disclosure.

FIG. 13 is a flowchart illustrating an exemplary process 1300 for determining a white balance gain according to some embodiments of the present disclosure. Process 1300 may be performed by the white balance gain module 320 as exemplified in FIG. 3 and the description thereof. In some embodiments, one or more operations of process 1300 for determining the white balance gain may be performed by the computing device 200A as illustrated in FIG. 2A, or the mobile device 200B as illustrated in FIG. 2B. In some embodiments, 603 of process 600 may be performed according to process 1300.

At 1301, the near infrared intensity of a target image may be retrieved. In some embodiments, the near infrared intensity may be retrieved from the near infrared intensity determination sub-unit 317.

At 1303, the coordinates of points in a coordinate system may be retrieved. A point in the coordinate system may correspond to a region of a plurality of regions of the target image. In some embodiments, the coordinates of the points may be retrieved from the coordinate determination unit 313. In some embodiments, the coordinates of a point corresponding to a region of the plurality of regions may be determined according to process 800 as illustrated in FIG. 8. Presented in the coordinate system may include a reference color-temperature curve (e.g., the curve 1), two first distance color-temperature curves (e.g., the curve 21 and 22) and two second distance color-temperature curves (e.g., the curve 31 and 32) as exemplified in FIG. 19 and the description thereof.

The reference color-temperature curve may be determined based on the values of one or more color components of a plurality of pixels of a gray and white card with different color temperatures. The two first distance color-temperature curves may be located on different sides of the reference color-temperature curve, as illustrated in FIG. 19. A first distance color-temperature curve may be substantially parallel to the reference color-temperature curve. A first distance color-temperature curve may be spaced from the reference color-temperature curve by a first distance. The two second distance color-temperature curves may be located on different sides of the reference color-temperature curve, as illustrated in FIG. 19. A second distance color-temperature curve may be substantially parallel to the reference color-temperature curve. A second distance color-temperature curve may be spaced from the reference color-temperature curve by a second distance. The first distance may be less than the second distance. A second distance color-temperature curve that is located on the same side of the reference color-temperature curve as a first distance color-temperature curve may be spaced further away from the reference color-temperature curve than the first distance color-temperature curve. See, for example, FIG. 19 and the description thereof.

At 1305, a region weight corresponding to a region of the plurality of regions in the target image may be determined based on the near infrared intensity and the coordinates of the point corresponding to the region.

In some embodiments, a spatial relationship between the point corresponding to a region and a reference color-temperature curve, two first distance color-temperature curves, or two second distance color-temperature curves in the coordinate system may be determined. The region weight of a region may be determined based on the spatial relationship. For example, the region weight of a region whose corresponding point is located between the two first distance color-temperature curves may be set to 1. For another example, the region weight of a region whose corresponding point is located outside of an area between the two second distance color-temperature curves may be set to 0.

At 1307, a white balance gain of the target image may be determined based on the region weights corresponding to the plurality of regions in the target image. The white balance gain of the target image may include a red gain of the red color component, a green gain of the green color component, and/or a blue gain of the blue color component. In some embodiments, the white balance gain may be determined based on the following formulas:

$$\begin{cases} R_{gain} = \dfrac{\sum_i^n G_{avg}^i \times weight_i}{\sum_i^n R_{avg}^i \times weight_i} \\ B_{gain} = \dfrac{\sum_i^n G_{avg}^i \times weight_i}{\sum_i^n B_{avg}^i \times weight_i} \end{cases} \quad (10)$$

where $R_{gain}$ is a red gain of the red color component, $B_{gain}$ is a blue gain of the blue color component, $R_{avg}^i$ is an average of the red color component of region i, $B_{avg}^i$ is an average of the blue color component of region i, and $weight_i$ is the region weight of the region i. A G gain of a green color component may be 1. In other words, the green color component may remain unchanged while the white balance of the target image is adjusted.

It should be noted that the above description of process 1300 is merely provided for the purposes of illustration, and not intended to be understood as the only embodiment. For persons having ordinary skills in the art, various variations and modifications may be conduct under the teaching of some embodiments of the present disclosure. For example, 1301 may be performed before 1303 is performed. However, those variations and modifications may not depart from the protecting of some embodiments of the present disclosure.

Figure 14:
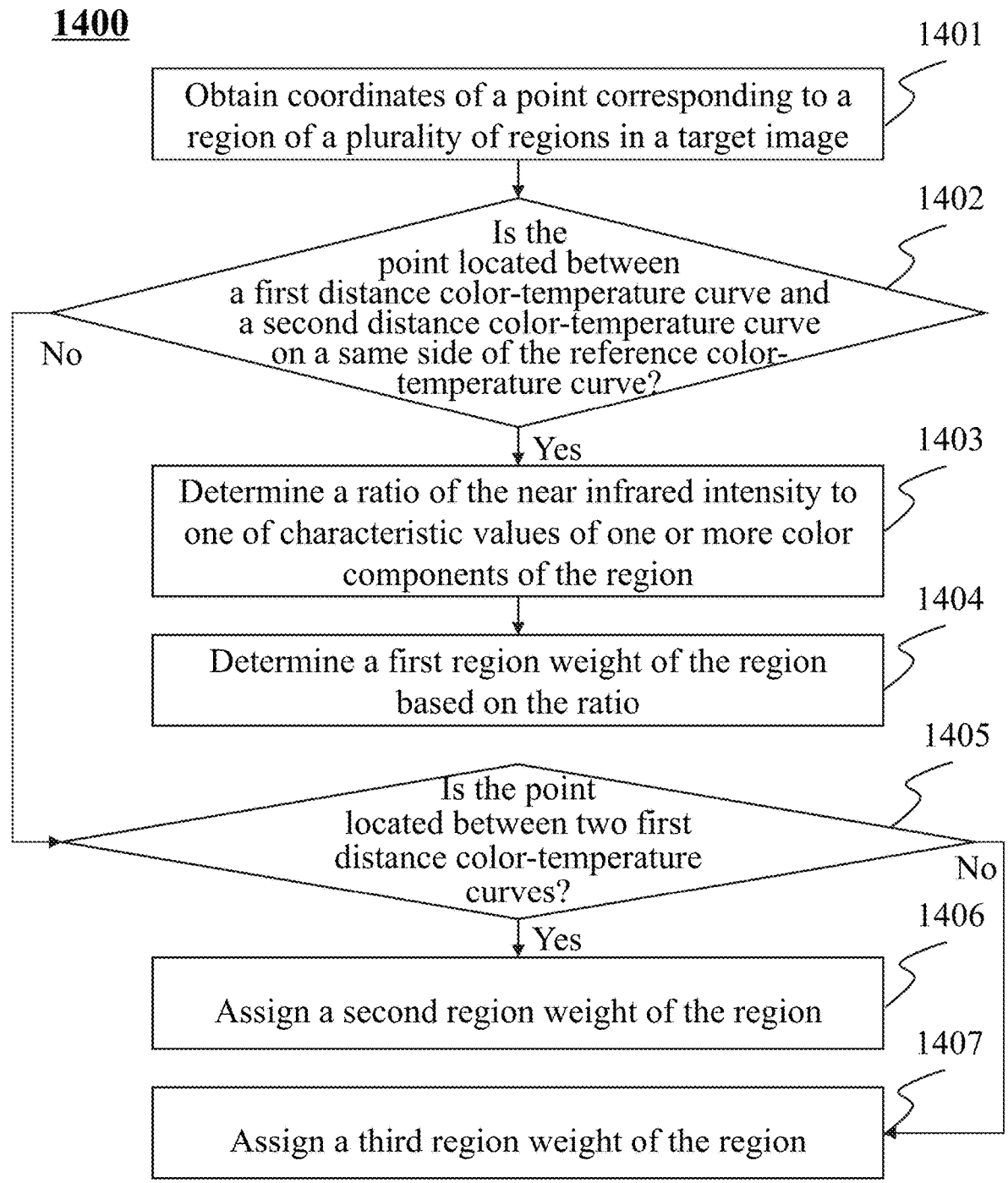
FIG. 14 is a flowchart illustrating an exemplary process for determining a region weight corresponding to a region according to some embodiments of the present disclosure.

FIG. 14 is a flowchart illustrating an exemplary process 1400 for determining a region weight corresponding to a region according to some embodiments of the present disclosure. Process 1400 may be performed by the white balance module 320 as exemplified in FIG. 3 and the description thereof. In some embodiments, one or more operations of process 1400 for determining the region weight corresponding to the region may be performed by the computing device 200A as illustrated in FIG. 2A, or the mobile device 200B as illustrated in FIG. 2B. In some embodiments, 1305 of process 1300 may be performed according to process 1400.

At 1401, the coordinates of a point corresponding to a region of a plurality of regions in a target image may be obtained.

At 1402, a determination may be made as to whether the point is located between a first distance color-temperature curve and a second distance color-temperature curve on a same side of the reference color-temperature curve. As used herein, that a point is located between the first distance color-temperature curve and the second distance color-temperature curve on a same side means the distance between the point and the reference color-temperature curve is between a first distance and a second distance along the direction from the reference color-temperature curve to the point (e.g., direction a, direction b, etc.). FIG. 19 illustrates the first distance color-temperature curve (e.g., the curves 21 and 22), the second distance color-temperature curve (e.g., the curves 31 and 32), the reference color-temperature curve (e.g., the curve 1), the first distance (e.g., DIS1), the second distance (e.g., DIS2), direction a, and direction b. The distance between the first distance color-temperature curve and the reference color-temperature curve in a selected direction (e.g., direction a or direction b as shown in FIG. 19) may be a first distance. The distance between the second distance color-temperature curve and the reference color-temperature curve in a selected direction (e.g., direction a or direction b as shown in FIG. 19) may be a second distance. In some embodiments, the first distance may be smaller than the second distance. With respect to a point located between the first distance color-temperature curve and the second distance color-temperature curve on a same side of the color-temperature curve, 1403 may be performed. For example, with respect to the point (e.g., point C) located between the curve 21 and the curve 31 (e.g., the distance between the point and the reference color-temperature curve is greater than DIS1 and smaller than DIS2 in direction a), or the point (e.g., point D) located between the curve 22 and the curve 32 (e.g., the distance between the point and the reference color-temperature curve is greater than DIS1 and smaller than DIS2 in direction b) as shown in FIG. 19, 1403 may be performed.

With respect to a point located outside of an area between the first color-temperature curve and the second distance color-temperature curve on a same side of the reference color-temperature curve, 1405 may be performed. For example, with respect to a point (e.g., point B) located between the curve 22 and the curve 21 as shown in FIG. 19, 1406 may be performed. For another example, with respect to a point (e.g., point E) located outside the curve 31 or a point (e.g., point F) located outside the curve 32 as shown in FIG. 19, 1407D may be performed.

At 1403, a ratio of the near infrared intensity of a region to at least one of characteristic values of one or more color components of the region may be determined. Merely by way of example with reference to an RGB color model, the characteristic value of a color component of the region may be an average value of a color component including, for example, the red color component, the green color component, and/or the blue color component.

In some embodiments, the ratio of the near infrared intensity to a characteristic value of a color component of the region may be determined based on a method as described in 1102.

Figure 15:
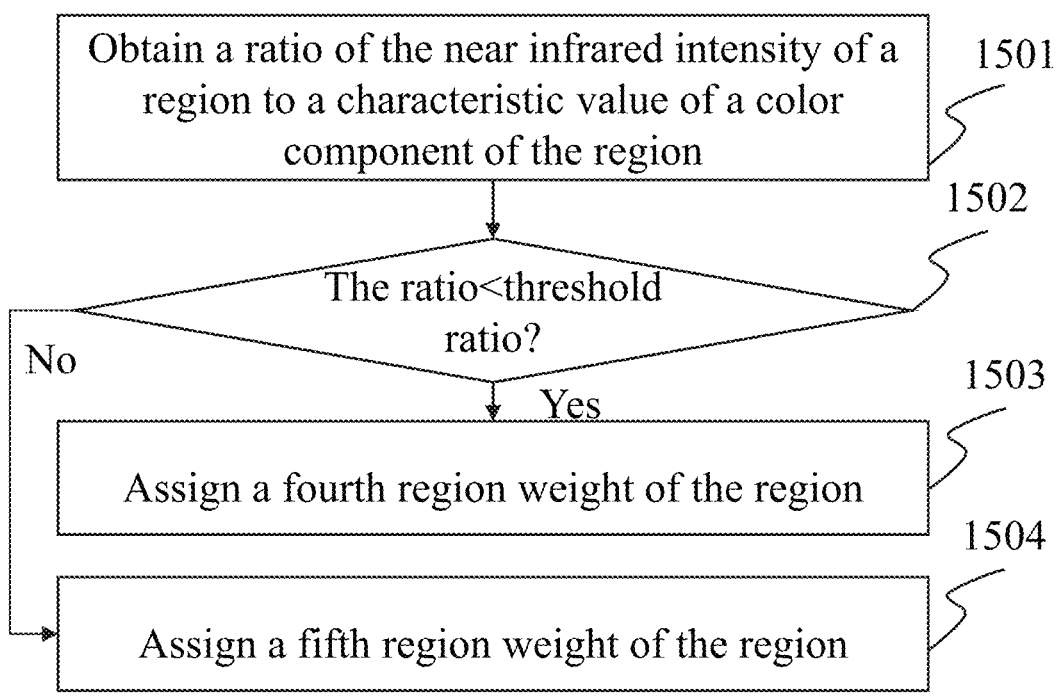
FIG. 15 is a flowchart illustrating an exemplary process for determining a region weight corresponding to a region according to some embodiments of the present disclosure.

At 1404, a first region weight of the region based on the ratio may be determined. The first region weight of the region may be determined based on a comparison result. The comparison result may be a ratio of the near infrared intensity of the region to a characteristic value of a color component of the region. In some embodiments, the characteristic value of a color component of a region may include an average value of the values of the color component of the pixels of the region. In some embodiments, 1404 may be performed according to process 1500 (as illustrated in FIG. 15).

At 1405, a determination may be made as to whether the point corresponding to a region is located between two first distance color-temperature curves. The two first distance color-temperature curves may be curves 11 and 21 as shown in FIG. 19. With respect to a point located between the two first distance color-temperature curves (e.g., point B), 1406 may be performed.

At 1406, the region may be assigned a second region weight. At 1407, the region may be assigned a third region weight. The second region weight of the region may correspond to the weight of a region corresponding to a point (e.g., point B in FIG. 19) located between the two first distance color-temperature curves (e.g., the curve 21 and curve 22 as shown in FIG. 19). The third region weight of the region may correspond to the weight of a region corresponding to a point (e.g., point E, point F in FIG. 19) located outside the two second distance color-temperature curves (e.g., the curve 32 and curve 31 as shown in FIG. 19).

In some embodiments, the second region weight may be 1. In some embodiments, the third region weight may be 0. In some embodiments, the second region weight or the third region weight may be any value no less than 0 and no more than 1. In some embodiments, the second region weight may be greater than the third region weight.

FIG. 15 is a flowchart illustrating an exemplary process 1500 for determining a region weight corresponding to a region according to some embodiments of the present disclosure. Process 1500 may be performed by the white balance module 320 as exemplified in FIG. 3 and the description thereof. In some embodiments, one or more operations of process 1500 for determining the region weight corresponding to the region may be performed by the computing device 200A as illustrated in FIG. 2A, or the mobile device 200B as illustrated in FIG. 2B. In some embodiments, 1404 of process 1400 may be performed according to process 1500.

At 1501, a ratio of the near infrared intensity of a region to a characteristic value of a color component of the region may be obtained. In some embodiments, the ratio of the near infrared intensity of a region to a characteristic value of a color component of the region may be determined as described with respect to 1102 as shown in FIG. 11 or 1403 as shown in FIG. 14.

At 1502, a determination may be made as to whether the ratio is less than a threshold ratio. When the ratio is less than a threshold ratio, 1503 may be performed. When the ratio exceeds the threshold ratio, 1504 may be performed. The situation when the ratio is equal to the threshold ratio may be grouped with the situation when the ratio is smaller than the threshold ratio, or with the situation when the ratio exceeds the threshold ratio. For instance, when the ratio is equal to the threshold ratio, 1503 may be performed. As another example, when the ratio is equal to the threshold ratio, 1504 may be performed.

At 1503, the region may be assigned a fourth region weight. In 1504, the region may be assigned a fifth region weight. The fourth region weight or the fifth region weight may be greater than or equal to 0, and be less than or equal to 1. The fourth region weight may be greater than the fifth region weight. In some embodiments, the fourth region weight may be 1, and the fifth region weight may be 0.

It should be understood that the preceding description of processes 600, 700, 800, 900, 1000A, 1000B, 1100, 1200, 1300, 1400, and 1500 are merely provided for the purposes of illustration, and not intended to limit the scope of the present disclosure. At least one of processes 600, 700, 800, 900, 1000A, 1000B, 1100, 1200, 1300, 1400, and 1500 may be performed by processing logic that comprises hardware (e.g., circuitry, dedicated logic, programmable logic, microcode, etc.), software (e.g., instructions run on a processing device to perform hardware simulation), and/or a combination thereof.

FIG. 16 shows an exemplary sixty-six rectangular regions in an image according to some embodiments of the present disclosure. The length of the image may be divided into six equal parts, and the width of the image may be divided into six equal parts. The image may be divided into sixty-six rectangular regions.

Figure 17A:
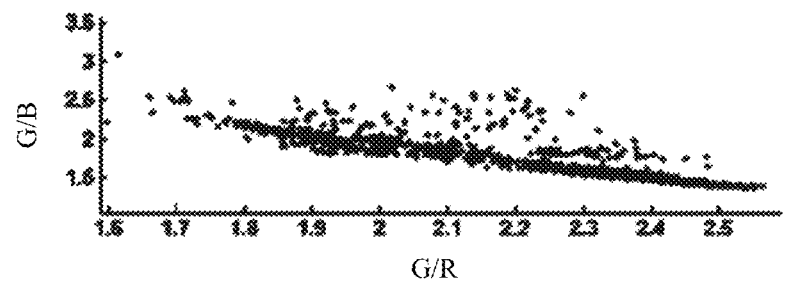
FIG. 17A is an exemplary coordinate system corresponding to an image according to some embodiments of the present disclosure.
Figure 17B:
FIG. 17B is an exemplary image including light of multiple color temperatures according to some embodiments of the present disclosure.

FIG. 17A is an exemplary coordinate system corresponding to an image according to some embodiments of the present disclosure. FIG. 17B is an exemplary image including light of multiple color temperatures according to some embodiments of the present disclosure. The lighting condition of the image shown in FIG. 17B included light of multiple color temperatures. The horizontal axis and the vertical axis of the coordinate system illustrated in FIG. 17A may be G/R and GB values, respectively. The coordinates of the points corresponding to the regions in the image may distribute approximately along a straight line in the coordinate system, as illustrated in FIG. 17A.

Figure 18:
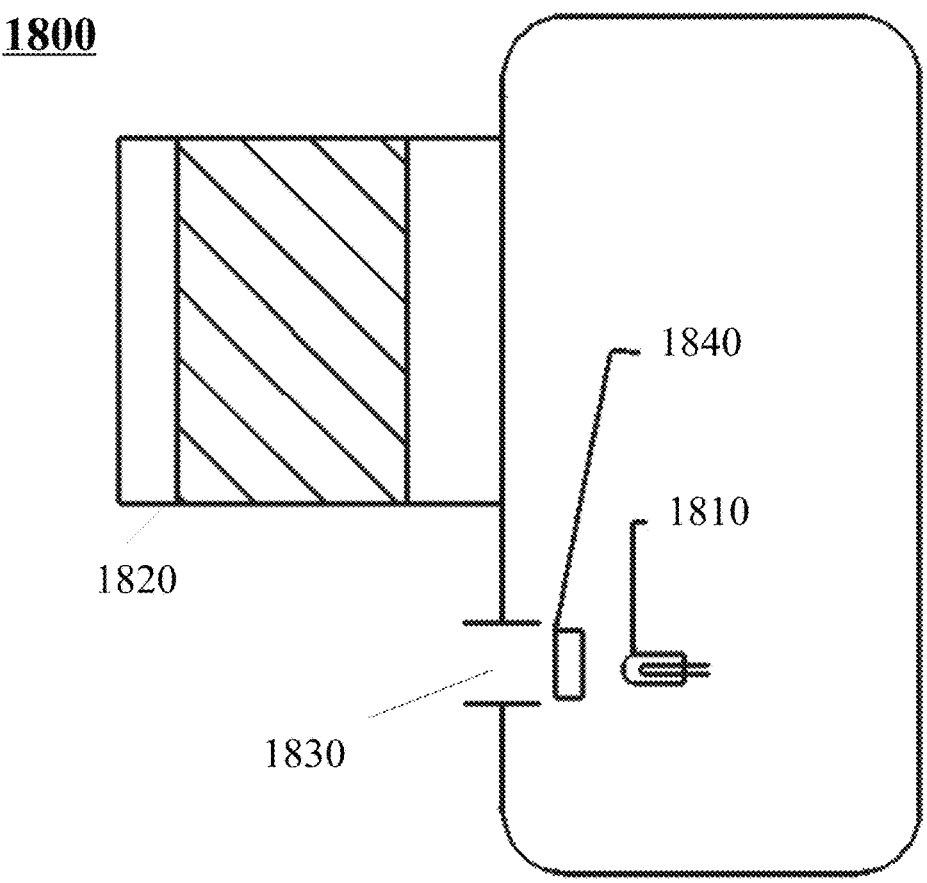
FIG. 18 is a block diagram illustrating an exemplary image capturing device according to some embodiments of the present disclosure.

FIG. 18 is a block diagram illustrating an exemplary image capturing device according to some embodiments of the present disclosure. As shown, image capturing device 1800 may include a photo sensor 1810, a camera 1820, an aperture 1830, and an optical filter 1840. The image capturing device 1800 may be an example of the imaging device 110 as shown in FIG. 1. The optical filter 1840 may be used to detect the near infrared intensity of an image obtained by the capturing device 1800. As used herein, the near infrared intensity of an image refers to the near infrared intensity captured by the image capturing device when the image was captured.

FIG. 19 illustrates an exemplary reference color-temperature curve, two exemplary first distance color-temperature curves, and two exemplary second distance color-temperature curves according to some embodiments of the present disclosure.

As shown, curve 1 may be a reference color-temperature curve, curves 22 and 21 may be two first distance color-temperature curves, and curves 32 and 31 may be two second distance color-temperature curves in the coordinate system. Merely by way of example, a reference color-temperature curve may be the Planckian locus or black body locus, the path or locus that the color of an incandescent black body may take in a particular chromaticity space as the blackbody temperature changes. The color-temperature curve may go from deep red at low color temperatures through orange, yellowish white, white, and finally bluish white at high temperatures.

Direction a may be the normal direction of the reference color-temperature curve at a point A. Direction b may be opposite to direction a. The point A may be any point on the reference color-temperature curve. The two first distance color-temperature curves (e.g., curve 21 and curve 22) may be determined by shifting the reference color-temperature curve (e.g., curve 1) by a first distance (e.g., DIS1) along direction a or direction b. The two second distance color-temperature curves (e.g., curve 31 and curve 32) may be determined by shifting the reference color-temperature curve (e.g., curve 1) by a second distance (e.g., DIS2) along direction a or direction b. Accordingly, the distance between the reference color-temperature curve (e.g., the curve 1) and the first distance color-temperature curves (e.g., the curve 21 and 22) may be a first distance (e.g., DIS1) along direction a or direction b. The distance between the reference color-temperature curve and the second distance color-temperature curve of a same side (e.g., the curve 1 and the curve 31, and the curve 1 and the curve 32) may be a second distance (e.g., DIS2) along direction a or direction b.

When the distance between a point corresponding to a region and the reference color-temperature curve in direction a or direction b is smaller than the first distance, the lighting condition of an image or a portion thereof (e.g., a region of the image) may be determined to include artificial light. When the distance between a point corresponding to a region and the reference color-temperature curve in direction a or direction b is between the first distance and the second distance, the lighting condition of the image or a portion thereof may be determined to include sunlight.

Figure 20:
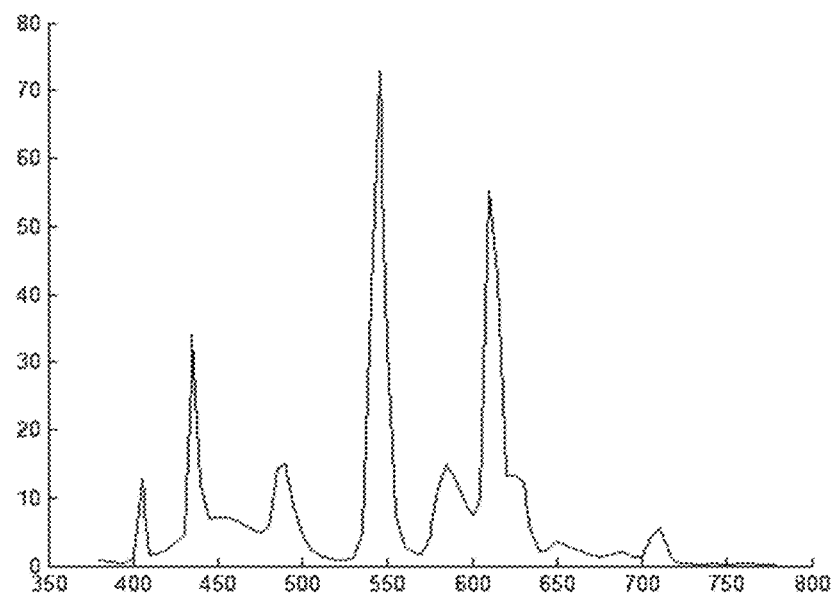
FIG. 20 is an exemplary spectrogram of a fluorescent lamp according to some embodiments of the present disclosure.
Figure 21:
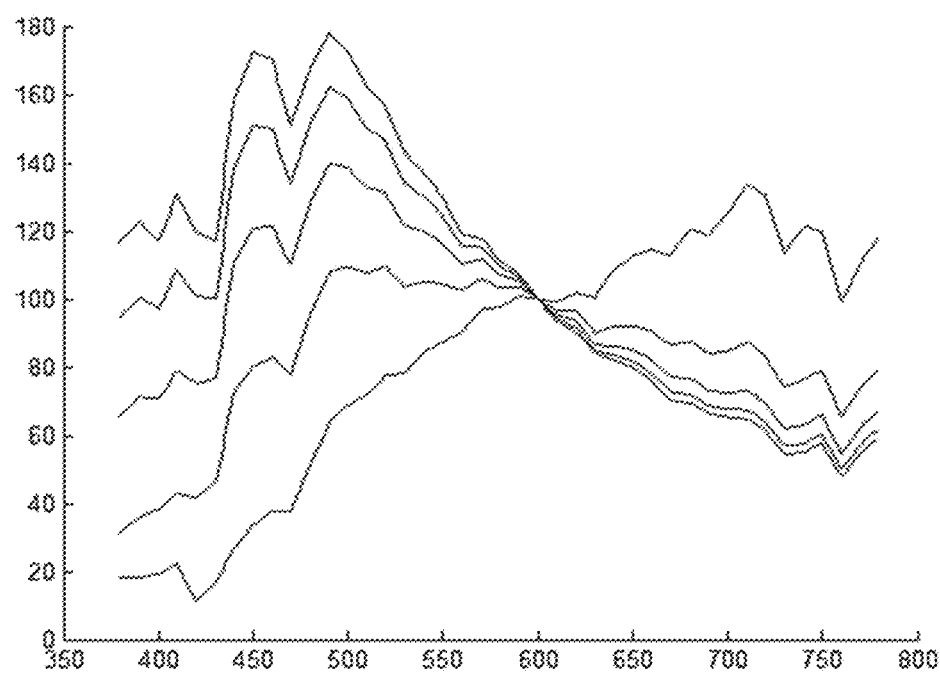
FIG. 21 is an exemplary spectrogram of natural lights according to some embodiments of the present disclosure.

FIG. 20 is an exemplary the spectrogram of a fluorescent lamp according to some embodiments of the present disclosure. FIG. 21 is an exemplary the spectrogram of natural light. The horizontal axis and the vertical axis of the spectrogram may represent the wavelength of light and the intensity of the light, respectively. The luminous intensity within the near infrared range of a fluorescent lamp may be smaller than the luminous intensity within the visible light range of the fluorescent lamp. The luminous intensity within the near infrared range of the natural light may be greater than the luminous intensity within the near infrared range of the fluorescent lamp. Accordingly, the fluorescent lamp and the natural light may be distinguished within the near infrared range. In some embodiments, the light having the wavelength of more than 700 nm may be treated as near infrared light.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Computer program code for carrying out operations for aspects of the present disclosure may be written in any combination of one or more programming languages, including an object oriented programming language such as Java, C++, C #, VB, Scala, Smalltalk, Eiffel, JADE, Emerald, NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "reducing," "registering," "reconstructing," "segmenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

Accordingly, methods, systems, and media for image reconstruction are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter.

What is claimed is:

1. A method for image processing implemented on at least one device each of which has at least one processor and storage, the method comprising:
    obtaining a target image;
    determining a plurality of regions in the target image;
    determining, based on coordinates of a plurality of points representing the plurality of regions, a first color-temperature vector of the target image;
    determining, based on the first color-temperature vector and a second color-temperature vector of a reference image, a first lighting condition of the target image when the target image is captured;
    determining, based on the first lighting condition of the target image, a white balance gain of the target image; and
    adjusting, based on the white balance gain, white balance of the target image.

2. The method of claim 1, wherein the determining, based on the coordinates of the plurality of points representing the plurality of regions, the first color-temperature vector of the target image includes:
    clustering, based on the coordinates of the plurality of points, the plurality of region to obtain a first cluster and a second cluster;
    determining a first element corresponding to the first cluster;
    determining a second element corresponding to the second cluster; and
    determining, based on the first element and the second element, the first color-temperature vector.

3. The method of claim 1, wherein the determining, based on the first color-temperature vector and the second color-temperature vector of the reference image, the first lighting condition of the target image includes:
    obtaining the second color-temperature vector of the reference image captured in a second lighting condition including light of multiple color temperatures;
    determining an angle between the first color-temperature vector and the second color-temperature vector; and
    determining the first lighting condition of the target image based at least on the angle.

4. The method of claim 3, wherein the determining the first lighting condition of the target image based at least on the angle includes:
    determining whether the angle exceeds a threshold angle; and
    in response to a determination that the angle exceeds the threshold angle, determining that the first lighting condition of the target image includes light of a single color temperature.

5. The method of claim 4, further comprising:
    in response to a determination that the angle is less than the threshold angle, determining that the first lighting condition of the target image includes light of multiple color temperatures.

6. The method of claim 5, wherein the determining, based on the first lighting condition of the target image, the white balance gain of the target image includes:
    determining a first white balance gain of the target image according to a first white balance gain algorithm;
    determining a second white balance gain of the target image according to a second white balance gain algorithm;
    determining the white balance gain of the target image based on the angle between the first color-temperature vector and the second color-temperature vector, the first white balance gain, and the second white balance gain.

7. The method of claim 6, wherein the determining the white balance gain of the target image based on the angle between the first color-temperature vector and the second color-temperature vector, the first white balance gain, and the second white balance gain includes:
    determining a multi-color-temperature parameter based on the angle between the first color-temperature vector and the second color-temperature vector;
    determining, based on the multi-color-temperature parameter, a first gain weight of the first white balance gain and a second gain weight of the second white balance gain; and
    determining the white balance gain of the target image based on the first gain weight, the second gain weight, the first white balance gain, and the second white balance gain.

8. The method of claim 7, wherein the second gain weight of the second white balance gain is equal to the multi-color-temperature parameter, and the sum of the first gain weight and the second gain weight is equal to one.

9. The method of claim 7, wherein a ratio of the second gain weight to the sum of the first gain weight and the second gain weight is equal to the multi-color-temperature parameter.

10. The method of claim 4, wherein before determining whether the angle exceeds a threshold angle, the method further includes at least one of:
    determining that an illumination of a target image exceeds a threshold illumination;
    determining that a color temperature of the first element or a color temperature of the second element belongs to a color temperature range of natural light; or
    determining that a distance between the first element and the second element exceeds a threshold distance.

11. A system for image processing, the system comprising:
    at least one storage medium including a set of instruction for image processing; and
    at least one processor in communication with the storage medium, wherein when executing the set of instructions, the at least one processor is directed to cause the system to perform operations including:

obtaining a target image;

determining a plurality of regions in the target image;

determining, based on coordinates of a plurality of points representing the plurality of regions, a first color-temperature vector of the target image;

determining, based on the first color-temperature vector and a second color-temperature vector of a reference image, a first lighting condition of the target image when the target image is captured;

determining, based on the first lighting condition of the target image, a white balance gain of the target image; and adjusting, based on the white balance gain, white balance of the target image.

12. The system of claim 11, wherein the determining, based on the coordinates of the plurality of points representing the plurality of regions, the first color-temperature vector of the target image includes:

clustering, based on the coordinates of the plurality of points, the plurality of region to obtain a first cluster and a second cluster;

determining a first element corresponding to the first cluster;

determining a second element corresponding to the second cluster; and determining, based on the first element and the second element, the first color-temperature vector.

13. The system of claim 11, wherein the determining, based on the first color-temperature vector and the second color-temperature vector of the reference image, the first lighting condition of the target image includes:

obtaining the second color-temperature vector of the reference image captured in a second lighting condition including light of multiple color temperatures;

determining an angle between the first color-temperature vector and the second color-temperature vector; and determining the first lighting condition of the target image based at least on the angle.

14. The system of claim 13, wherein the determining the first lighting condition of the target image based at least on the angle includes:

determining whether the angle exceeds a threshold angle; and in response to a determination that the angle exceeds the threshold angle, determining that the first lighting condition of the target image includes light of a single color temperature.

15. The system of claim 14, wherein the operations further include:

in response to a determination that the angle is less than the threshold angle, determining that the first lighting condition of the target image includes light of multiple color temperatures.

16. The system of claim 15, wherein the determining, based on the first lighting condition of the target image, the white balance gain of the target image includes:

determining a first white balance gain of the target image according to a first white balance gain algorithm;

determining a second white balance gain of the target image according to a second white balance gain algorithm;

determining the white balance gain of the target image based on the angle between the first color-temperature vector and the second color-temperature vector, the first white balance gain, and the second white balance gain.

17. The system of claim 16, wherein the determining the white balance gain of the target image based on the angle between the first color-temperature vector and the second color-temperature vector, the first white balance gain, and the second white balance gain includes:

determining a multi-color-temperature parameter based on the angle between the first color-temperature vector and the second color-temperature vector;

determining, based on the multi-color-temperature parameter, a first gain weight of the first white balance gain and a second gain weight of the second white balance gain; and determining the white balance gain of the target image based on the first gain weight, the second gain weight, the first white balance gain, and the second white balance gain.

18. The system of claim 17, wherein the second gain weight of the second white balance gain is equal to the multi-color-temperature parameter, and the sum of the first gain weight and the second gain weight is equal to one.

19. The system of claim 14, wherein before determining whether the angle exceeds a threshold angle, the operations further include at least one of:

determining that an illumination of a target image exceeds a threshold illumination;

determining that a color temperature of the first element or a color temperature of the second element belongs to a color temperature range of natural light; or determining that a distance between the first element and the second element exceeds a threshold distance.

20. A non-transitory computer readable medium, comprising at least one set of instructions, when accessed by at least one processor of a system for image processing, causes the system to execute a method, the method comprising:

obtaining a target image;

determining a plurality of regions in the target image;

determining, based on coordinates of a plurality of points representing the plurality of regions, a first color-temperature vector of the target image;

determining, based on the first color-temperature vector and a second color-temperature vector of a reference image, a first lighting condition of the target image when the target image is captured;

determining, based on the first lighting condition of the target image, a white balance gain of the target image; and adjusting, based on the white balance gain, white balance of the target image.

* * * * *